US008215545B2

(12) United States Patent
Otsu et al.

(10) Patent No.: US 8,215,545 B2
(45) Date of Patent: Jul. 10, 2012

(54) CONTROLLING DEVICE AND METHOD FOR CONTROLLING AN APPARATUS

(75) Inventors: Shuichi Otsu, Kanagawa (JP); Tomoya Narita, Chiba (JP)

(73) Assignee: Sony Corporation, Tokyo (JP)

( * ) Notice: Subject to any disclaimer, the term of this patent is extended or adjusted under 35 U.S.C. 154(b) by 603 days.

(21) Appl. No.: 11/417,148

(22) Filed: May 4, 2006

(65) Prior Publication Data

US 2006/0265083 A1 Nov. 23, 2006

(30) Foreign Application Priority Data

May 23, 2005 (JP) ................................ 2005-149668

(51) Int. Cl.
*G06K 5/00* (2006.01)
(52) U.S. Cl. ...................................... 235/382
(58) Field of Classification Search ................. 235/382
See application file for complete search history.

(56) References Cited

U.S. PATENT DOCUMENTS

| 7,404,518 | B2* | 7/2008 | Nakamura et al. | 235/382 |
| 2001/0017630 | A1* | 8/2001 | Sakashita et al. | 345/635 |
| 2001/0033244 | A1* | 10/2001 | Harris et al. | 341/176 |
| 2004/0086264 | A1* | 5/2004 | Okada et al. | 386/69 |
| 2004/0205816 | A1* | 10/2004 | Barrett | 725/49 |
| 2005/0028191 | A1* | 2/2005 | Sullivan et al. | 725/28 |
| 2005/0028208 | A1* | 2/2005 | Ellis et al. | 725/58 |
| 2005/0044481 | A1* | 2/2005 | Collart | 715/500.1 |
| 2005/0097594 | A1* | 5/2005 | O'Donnell et al. | 725/15 |
| 2005/0108751 | A1* | 5/2005 | Dacosta | 725/39 |
| 2007/0089143 | A1* | 4/2007 | LeFevre et al. | 725/81 |

FOREIGN PATENT DOCUMENTS

| JP | 7-7631 | | 1/1995 |
| JP | 7-298368 | | 11/1995 |
| JP | 11243512 | A * | 9/1999 |
| JP | 2003-250106 | | 9/2003 |
| JP | 2005-109640 | | 4/2005 |
| WO | WO 2004/104773 | A2 | 12/2004 |

* cited by examiner

*Primary Examiner* — Daniel Hess
*Assistant Examiner* — David Tardif
(74) *Attorney, Agent, or Firm* — Oblon, Spivak, McClelland, Maier & Neustadt, L.L.P.

(57) ABSTRACT

A controlling device that controls an apparatus includes a display unit configured to display an image representing a certain scene included in content that is being played back by the apparatus; and an obtaining unit configured to obtain image data of the image from an apparatus that is providing the content.

14 Claims, 17 Drawing Sheets

CONTROLLING DEVICE AND METHOD FOR CONTROLLING AN APPARATUS

CROSS REFERENCES TO RELATED APPLICATIONS

The present invention contains subject matter related to Japanese Patent Application JP 2005-149668 filed in the Japanese Patent Office on May 23, 2005, the entire contents of which are incorporated herein by reference.

BACKGROUND OF THE INVENTION

1. Field of the Invention

The present invention relates to controlling devices and methods and programs. More specifically, the present invention relates to a controlling device and method and a program that are suitable for allowing a user to recognize an apparatus that is to be controlled.

2. Description of the Related Art

Various electronic apparatuses are constructed so that remote operations can be performed using controllers. As an example of electronic apparatus, in the case of a television receiver, it is possible to change the channel, volume, and so forth.

Furthermore, home networks have been proposed and are now coming into practice. In such a home network, a plurality of apparatuses is connected to a network, and the plurality of apparatuses connected to the network can be controlled using a single remote controller.

As remote controllers become more common, techniques for displaying content data by efficient operations under an environment where a remote controller or the like is used have been proposed, for example, as described in Japanese Unexamined Patent Application Publication No. 2004-94765.

SUMMARY OF THE INVENTION

However, after playback of content by a certain apparatus is instructed using a remote controller, it has not been possible to check relationship between the apparatus and the content under playback on the side of the remote controller. Thus, for example, when a plurality of playback apparatuses exist, it has been difficult for a user to recognize which playback apparatus is playing back which piece of content.

It is desired that relationship between a certain apparatus and content that is being played back by the apparatus can be recognized by a user using another apparatus.

According to an embodiment of the present invention, there is provided a controlling device that controls an apparatus, the controlling device including display means for displaying an image representing a certain scene included in content that is being played back by the apparatus; and obtaining means for obtaining image data of the image from an apparatus that is providing the content.

The obtaining means may obtain meta-information of the content and obtain the image data from the meta-information.

The image may be a moving picture.

The obtaining means may obtain the image data at predetermined intervals from the apparatus that is providing the content.

According to another embodiment of the present invention, there is provided a method of controlling a controlling device that controls an apparatus, the method including the steps of controlling display of an image representing a certain scene included in content that is being played back by the apparatus; and obtaining image data of the image from an apparatus that is providing the content.

According to another embodiment of the present invention, there is provided a program for a controlling device that controls an apparatus, the program including the steps of controlling display of an image representing a certain scene included in content that is being played back by the apparatus; and obtaining image data of the image from an apparatus that is providing the content.

According to the controlling device, method, and program of these embodiments of the present invention, as information regarding content that is being played back by a certain apparatus, an image representing one scene included in the content is presented to a user.

According to these embodiments of the present invention, it is possible to present information regarding content that is being played back by another apparatus.

Furthermore, it is possible to present a user with information representing relationship between content that is being played back by another apparatus and the apparatus that is playing back the content. Furthermore, it is possible to provide an image as information regarding the content that is being played back.

DESCRIPTION OF THE PREFERRED EMBODIMENTS

Now, embodiments of the present invention will be described. The correspondence between the aspects of the present invention described in this specification and embodiments of the present invention is, for example, as follows. It is to be understood, however, that even if an embodiment in the following description is not described as relating to a certain aspect of the present invention, that does not necessarily mean that the embodiment does not relate to that aspect of the present invention. Conversely, even if an embodiment is described herein as relating to a certain aspect of the present invention, that does not necessarily mean that the embodiment does not relate to other aspects of the present invention.

Furthermore, this description should not be construed as covering all the aspects of the present invention described in this specification. That is, the description does not deny the existence of aspects of the present invention that are described in this specification but not claimed in this application, i.e., the existence of aspects of the present invention that in future may be claimed by a divisional application or additionally claimed through amendments.

Figure 1:
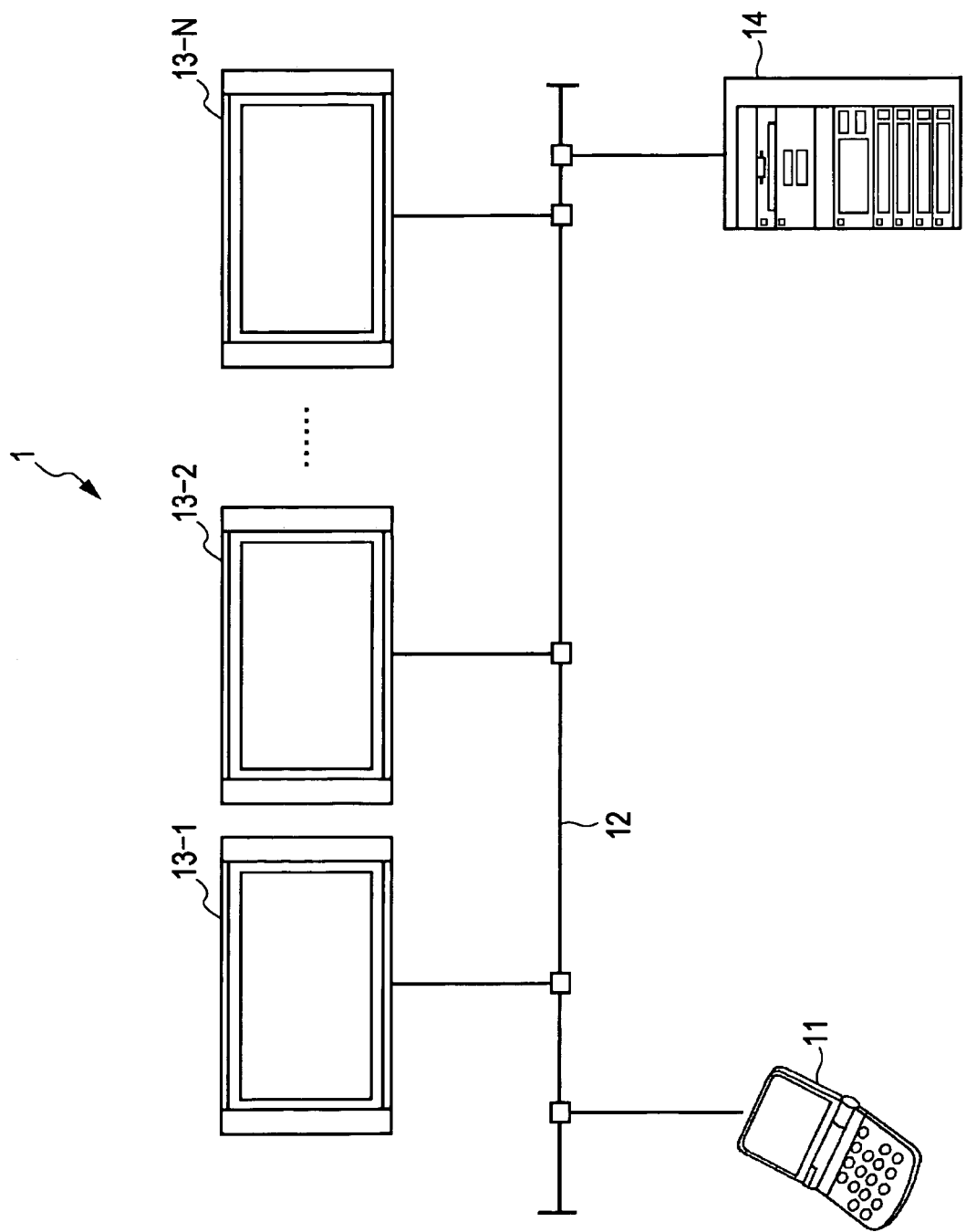
FIG. 1 is a block diagram of a content playback system according to an embodiment of the present invention.

A controlling device according to an embodiment of the present invention is, for example, a controller 11 shown in FIG. 1. The controlling device includes display means (e.g., an LCD 39 that displays a screen shown in FIG. 14) for displaying an image representing a certain scene included in content that is being played back by a device, and obtaining means (e.g., a content-information processor 205 that executes processing in steps S33 and S34 shown in FIG. 13) for obtaining image data of the image from the device that is providing the content.

Now, embodiments of the present invention will be described with reference to the drawings.

FIG. 1 is a block diagram showing a content playback system 1 according to an embodiment of the present invention.

In the content playback system 1, a controller 11, renderers 13-1 to 13-N, and a server 14 are connected to a network 12.

The controller 11 is, for example, a single-purpose terminal, or a terminal constructed together with a PDA (Personal Digital Assistant), a game machine, or the like, and can be connected to the network 12. The controller 11 is an electronic device according to an embodiment of the present invention.

The controller 11 sends a content-list obtaining request to the server 14 via the network 12. The content-list obtaining request is a request for obtaining information representing a list of pieces of content that can be provided by the server 14. A content list refers to information regarding pieces of content that can be provided by the server 14. The content list also includes information representing a status of content, for example, information representing which of the renderers 13-1 to 13-N is being used for playback.

Furthermore, the controller 11 sends a content playback instruction to one of the renderers 13-1 to 13-N. The content playback instruction is a request for playing back (displaying) a piece of content desired by the user.

The network 12 is formed by a wireless LAN (Local Area Network) compliant with the IEEE (the Institute of Electrical and Electronics Engineers, Inc.) 802.11 standard, or a wired LAN compliant with the Ethernet™ standard, a frame-based computer networking technology. The controller 11, the renderers 13-1 to 13-N, the server 14, and so forth are connected to each other via the network 12.

The network 12 is not limited to a wireless LAN compliant with the IEEE 802.11 standard or a wired LAN compliant with the Ethernet standard. The network 12 may be formed using various types of private or public networks, for example, the Internet, a telephone circuit, a PSTN (Public Switched Telephone Network) such as an ISDN (Integrated Services Digital Network), an optical fiber network such as an FDDI (Fiber Distributed Data Interface) network, a satellite communication network, a WAN (Wide Area Network), or a LAN.

Each of the renderers 13-1 to 13-N is a device that can be connected to the network 12, such as a television receiver or a PC (Personal Computer).

Each of the renderers 13-1 to 13-N receives a content playback instruction transmitted from the controller 11 via the network 12. In response to the content playback instruction, each of the renderers 13-1 to 13-N sends a content playback request to the server 14 to request the server 14 to provide certain content.

Each of the renderers 13-1 to 13-N receives and plays back content transmitted from the server 14 via the network 12 in response to the content playback request.

The server 14 is a device that can be connected to the network 12, such as a dedicated server or a PC.

The server 14 sends a content list to the controller 11 via the network 12 in response to a content-list obtaining request transmitted from the controller 11.

Furthermore, in response to a content playback request transmitted from one of the renderers 13-1 to 13-N, the server 14 sends (distributes) content encoded according to MPEG-2 (Moving Picture Experts Group phase 2), MPEG-4, or the like to one of the renderers 13-1 to 13-N at the source of the content playback request via the network 12.

In the following description, each of the renderers 13-1 to 13-N will be simply referred to as a renderer 13 unless distinction among the individual renderers 13-1 to 13-N should be made. Furthermore, although only one controller 11 and one server 14 are provided in the example of the content playback system 1 shown in FIG. 1 for simplicity of description, actually, a plurality of controllers 11 may be connected to the network 12. Similarly, a plurality of servers 14 may be provided.

Figure 2:
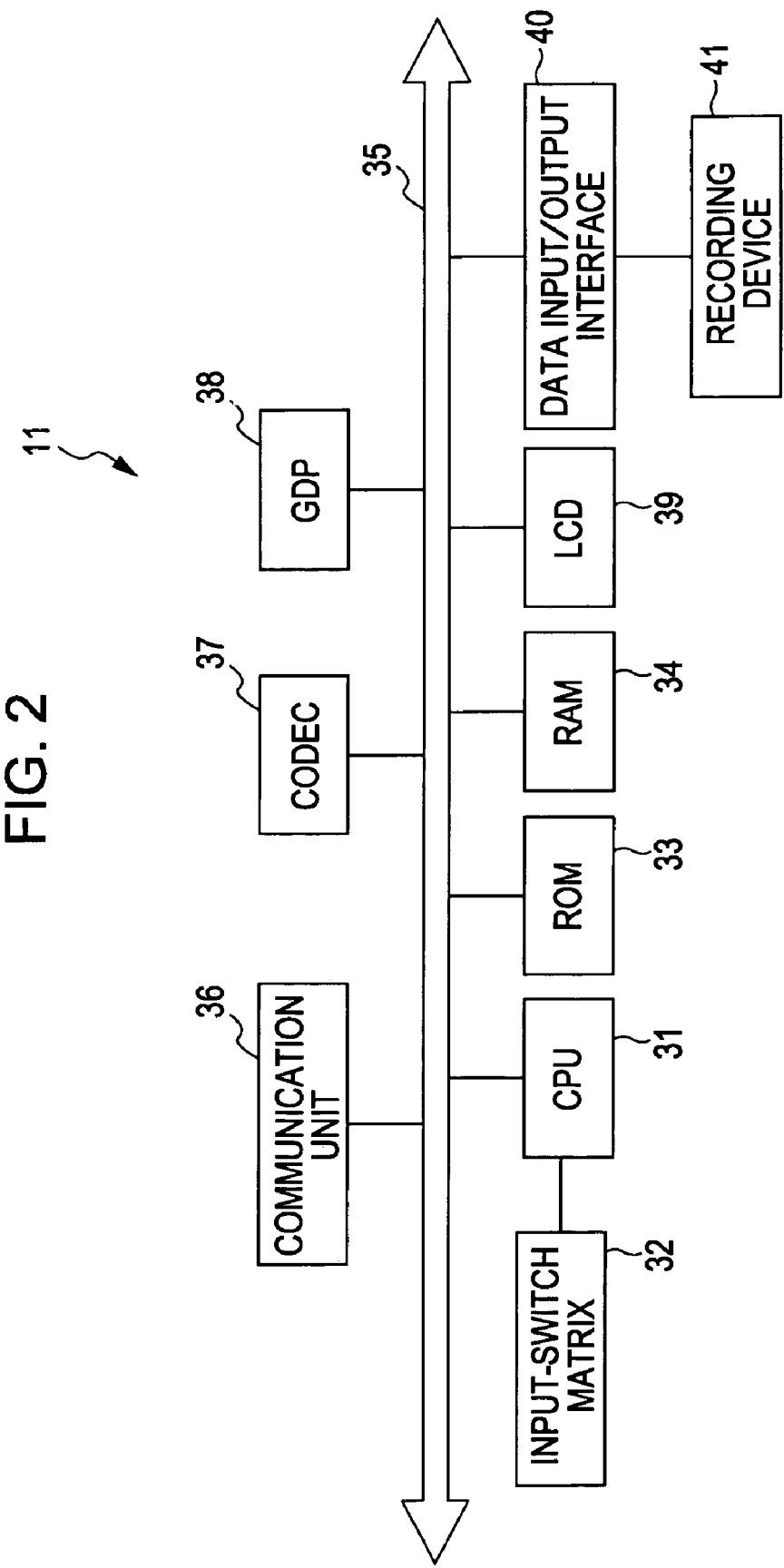
FIG. 2 is a block diagram showing an example configuration of a controller.

FIG. 2 is a block diagram showing an example configuration of the controller 11.

The controller 11 includes a CPU (Central Processing Unit) 31, an input-switch matrix 32, a ROM (Read-Only Memory) 33, a RAM (Random Access Memory) 34, a bus 35, a communication unit 36, a codec 37, a GDP (Graphic Display Processor) 38, an LCD (Liquid Crystal Display) 39, a data input/output interface 40, and a recording device 41. The CPU 31, the ROM 33, the RAM 34, the communication unit 36, the codec 37, the GDP 38, the LCD 39, and the data input/output interface 40 are connected to each other via the bus 35.

The CPU 31 controls the parts of the controller 11. The CPU 31 executes various processes according to programs stored in the ROM 33. The RAM 34 stores programs executed by the CPU 31, relevant data, and so forth as appropriate.

The input-switch matrix 32 includes a key operation unit having, for example, numeric keys, audio adjusting keys, picture-quality adjusting keys, and channel selecting keys. The input-switch matrix 32 supplies predetermined operation signals corresponding to user's operations to the CPU 31.

The communication unit 36 is formed, for example, by a wireless LAN interface compliant with the IEEE 802.11 standard or a wired LAN interface compliant with the Ethernet™ standard, a framed-based computer networking technology. The communication unit 36 carries out mutual communications by wireless or by wire with other devices, such as the renderers 13.

The codec 37 carries out encoding or decoding. For example, the codec 37 encodes video signals obtained by demodulating broadcast signals corresponding to broadcast radio waves of television broadcasting, such as terrestrial waves or radio waves from broadcasting satellites, received through an antenna (not shown) and supplied from the communication unit 36, a tuner (not shown), or the like, and supplies the encoded audio and image data to the recording device 41 via the data input/output interface 40. Also, for example, the codec 37 decodes audio and image data supplied from the recording device 41 via the data input/output interface 40, and supplies the decoded image data to the GDP 38 and supplies the decoded audio data to a speaker (not shown).

The GDP 38 controls the operation of the LCD 39 to display images on a screen of the LCD 39. For example, the GDP 38 displays an image corresponding to image data decoded by the codec 37 on the screen of the LCD 39.

The data input/output interface 40 is formed by a certain interface compatible with the recording device 41, such as a USB (Universal Serial Bus) interface or a memory-card interface. For example, when the recording device 41 is a hard disc, the data input/output interface 40 is formed by a certain interface compatible with an interface of the hard disc.

The recording device 41 is formed, for example, by a hard disc, a memory card, a DVD recordable, a CD (Compact Disc), a BD (Blu-Ray Disc™ which is an optical or magneto-optical disc storage medium), or a MD (Mini Disc™), which is a magneto-optical storage medium, and is connected to the data input/output interface 40. For example, the recording device 41 records encoded audio and image data supplied from the codec 37 via the data input/output interface 40, or supplies encoded audio and image data recorded thereon to the codec 37 via the data input/output interface 40.

Figure 3:
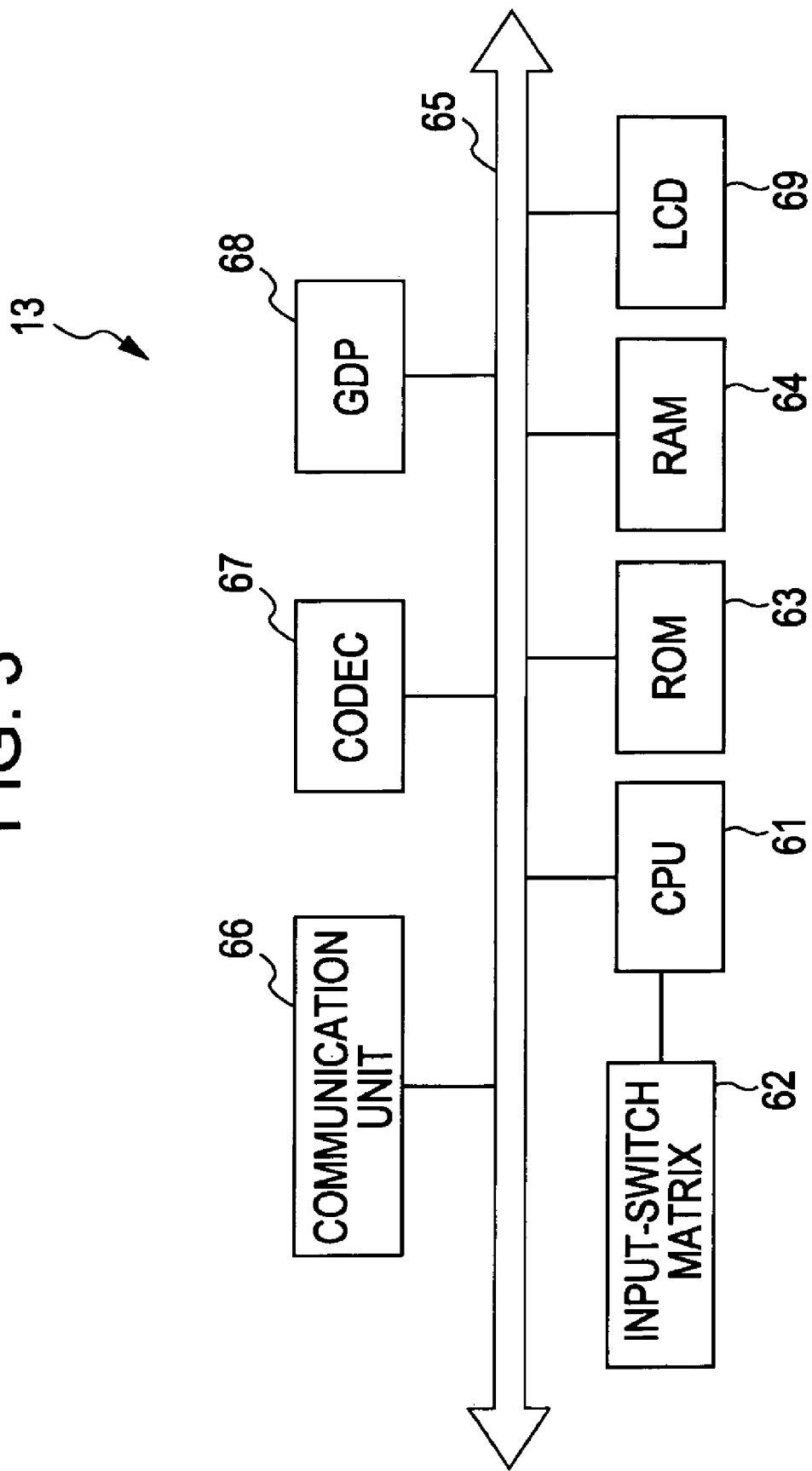
FIG. 3 is a block diagram showing an example configuration of a renderer.

FIG. 3 is a block diagram showing an example configuration of the renderer 13.

The renderer 13 includes a CPU 61, an input-switch matrix 62, a ROM 63, a RAM 64, a bus 65, a communication unit 66, a codec 67, a GDP 68, and an LCD 69. The CPU 61, the ROM 63, the RAM 64, the communication unit 66, the codec 67, the GDP 68, and the LCD 69 are connected to each other via the bus 65.

The CPU 61 controls the parts of the renderer 13. The CPU 61 executes various processes according to programs stored in the ROM 63. The RAM 64 stores programs executed by the CPU 61, relevant data, and so forth as appropriate.

The input-switch matrix 62 includes a key operation unit having, for example, numeric keys, audio adjusting keys, picture-quality adjusting keys, and channel selecting keys. The input-switch matrix 62 supplies predetermined operation signals corresponding to user's operations to the CPU 61.

The communication unit 66 is formed, for example, by a wireless LAN interface compliant with the IEEE 802.11 standard or a wired LAN interface compliant with the Ethernet™ standard, which is a frame-based computer networking technology. The communication unit 66 carries out mutual communications by wireless or by wire with other devices, such as the controller 11.

The codec 67 carries out encoding or decoding. For example, the codec 67 encodes video signals obtained by demodulating broadcast signals corresponding to broadcast radio waves of television broadcasting, such as terrestrial waves or radio waves from broadcasting satellites, received through an antenna (not shown) and supplied from the communication unit 66, a tuner (not shown), or the like, and supplies the encoded audio and image data to a recording device (not shown). Also, for example, the codec 67 decodes audio and image data supplied from a recording device (not shown), and supplies the decoded image data to the GDP 68 and supplies the decoded audio data to a speaker (not shown).

The GDP 68 controls the operation of the LCD 69 to display images on a screen of the LCD 69. For example, the GDP 68 displays an image corresponding to image data decoded by the codec 67 on the screen of the LCD 69.

Alternatively, the renderer 13 may be configured as shown in FIG. 2.

Figure 4:
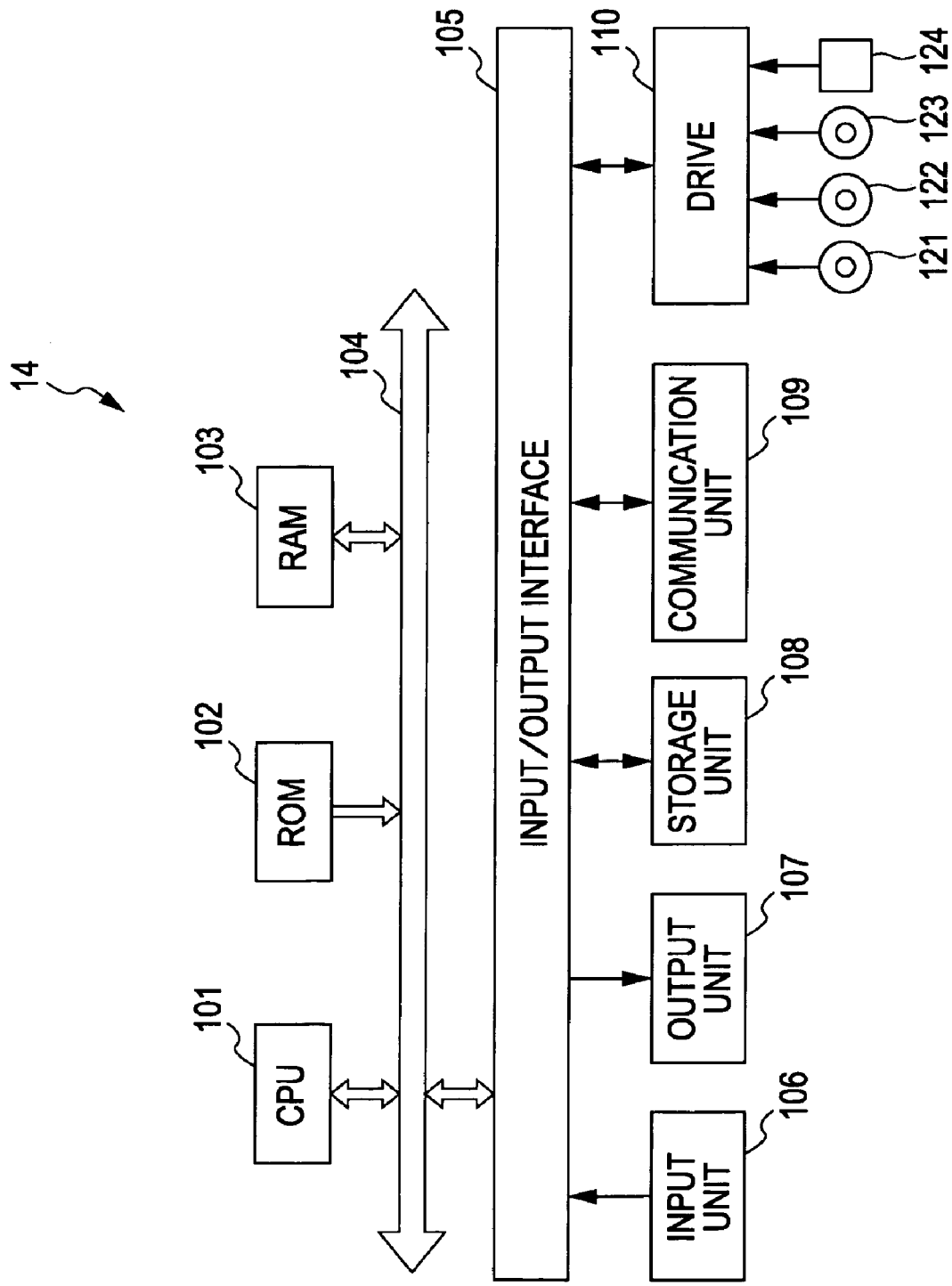
FIG. 4 is a block diagram showing an example configuration of a server.

FIG. 4 is a block diagram showing an example configuration of the server 14.

A CPU 101 executes various processes according to programs stored in a ROM 102 or programs stored in a storage unit 108. A RAM 103 stores programs executed by the CPU 101, relevant data, and so forth as appropriate. The CPU 101, the ROM 102, and the RAM 103 are connected to each other via a bus 104.

Furthermore, the CPU 101 is connected to an input/output interface 105 via the bus 104. The input/output interface 105 is connected to an input unit 106 including, for example, a keyboard and a mouse, and to an output unit 107 including, for example, a display. The CPU 101 executes various processes according to instructions input from the input unit 106. The CPU 101 outputs image, sound, and so forth obtained through the processes to the output unit 107.

The storage unit 108 is connected to the input/output interface 105, and is formed, for example, by a hard disc. The storage unit 108 stores programs executed by the CPU 101 and various types of data. A communication unit 109 carries out communications with external devices via the network 12, the Internet, or other networks or communication media.

Furthermore, a program may be obtained via the communication unit 109 and stored in the storage unit 108.

A drive 110 is connected to the input/output interface 105. The drive 110 drives a magnetic disc 121, an optical disc 122, a magneto-optical disc 123, a semiconductor memory 124, or the like mounted on the drive 110 to obtain a program, data, or the like recorded thereon. The program, data, or the like obtained is transferred to and stored in the storage unit 108 as appropriate.

Figure 5:
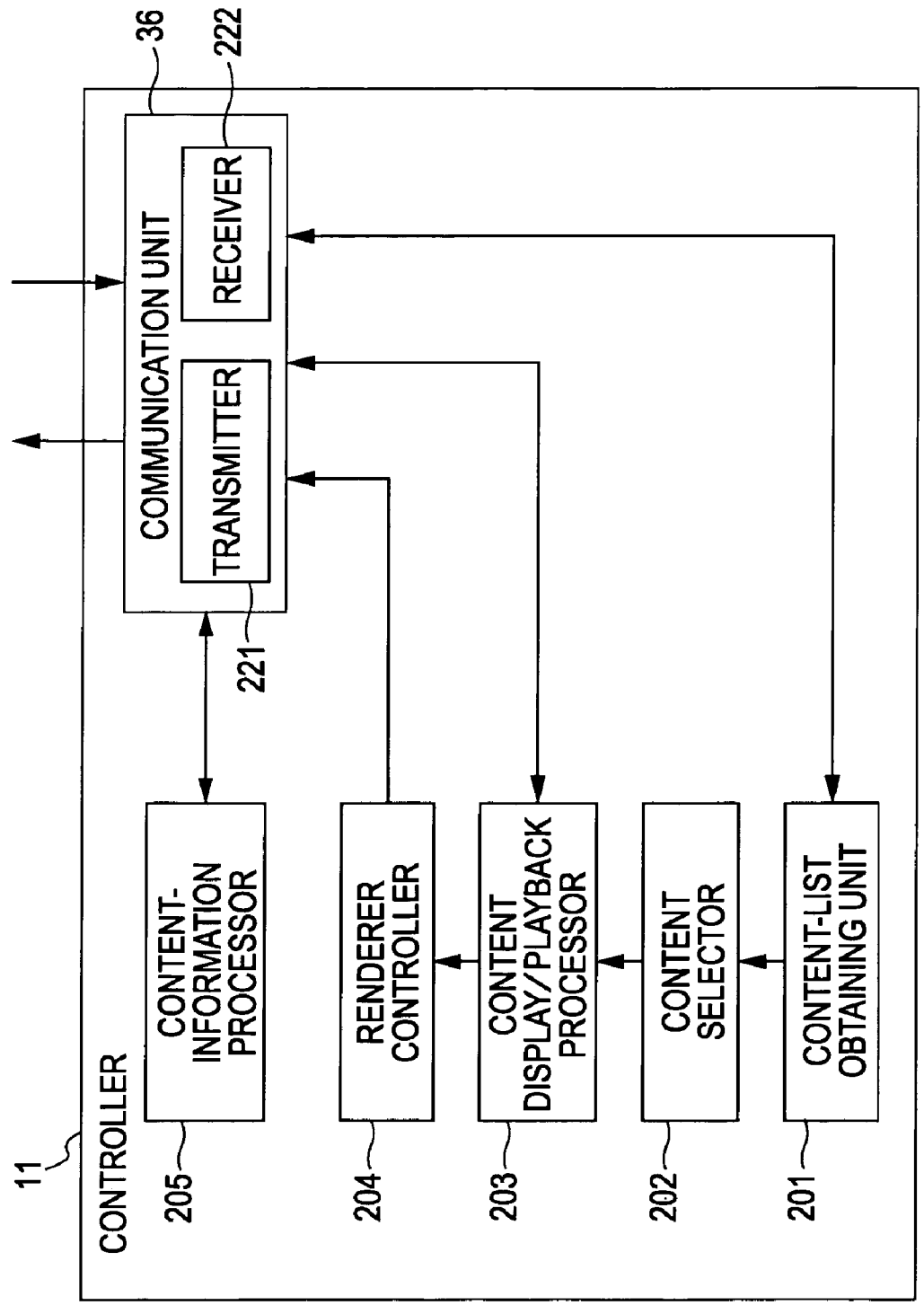
FIG. 5 is a block diagram showing an example functional configuration of the controller.

FIG. 5 is a block diagram showing an example functional configuration of the controller 11.

The controller 11 includes a communication unit 36, a content-list obtaining unit 201, a content selector 202, a content display/playback processor 203, a renderer controller 204, and a content-information processor 205.

The communication unit 36 corresponds to the communication unit 36 shown in FIG. 2. For example, the communication unit 36 carries out communications with the renderer 13 or the server 14 via the network 12. The communication unit 36 includes a transmitter 221 for sending various types of data and a receiver 222 for receiving various types of data.

The content-list obtaining unit 201 generates a content-list obtaining request in order to request for a list of pieces of content that can be provided by the server 14. The content-list obtaining unit 201 supplies the content-list obtaining request to the communication unit 36.

The transmitter 221 sends the content-list obtaining request supplied from the content-list obtaining unit 201 to the server 14 via the network 12. The receiver 222 supplies a content list received from the server 14 via the network 12 to the content-list obtaining unit 201.

The content-list obtaining unit 201 obtains the content list supplied from the communication unit 36 supplied from the communication unit 36 and supplies the content list to the GDP 38 so that the content list is displayed on the screen of the LCD 39 (FIG. 2).

The content selector 202 accepts selection of a piece of content from the content list displayed on the screen of the LCD 39, according to a user's operation of the input-switch matrix 32 (FIG. 2). Furthermore, the content selector 202 obtains information regarding the selected piece of content from the content-list obtaining unit 201, and supplies the information to the content display/playback processor 203.

The content display/playback processor 203 obtains the information regarding the piece of content that is to be played back according to the user's instruction, supplied from the content selector 202. On the basis of the information supplied from the content selector 202, the content display/playback processor 203 generates a content playback instruction, which is a request for instructing playback of content. The content display/playback processor 203 supplies the content playback instruction to the communication unit 36.

The transmitter 221 sends the content playback instruction supplied from the content display/playback processor 203 to the renderer 13 via the network 12. The renderer controller 204 supplies a command for controlling the renderer 13 to the transmitter 221 as appropriate according to instructions by the content display/playback processor 203 so that the transmitter 221 sends the command to the renderer 13.

The content-information processor 205 is provided so that, when a piece of content is being provided from the server 14 to a certain renderer 13, the user is allowed to recognize the status, for example, by obtaining a thumbnail image representing a scene of the piece of content and displaying the thumbnail image on the screen of the LCD 39.

Figure 6:
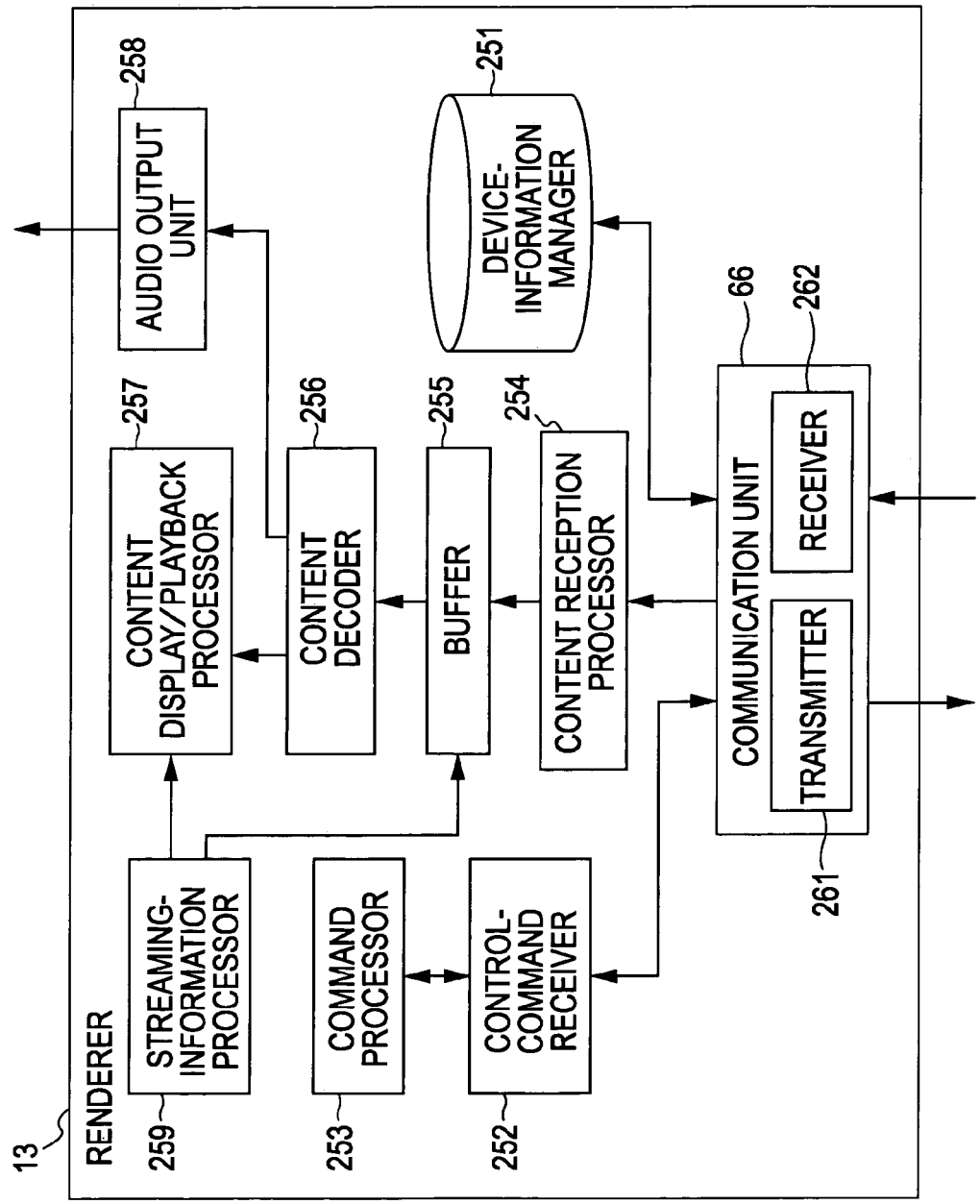
FIG. 6 is a block diagram showing an example functional configuration of the renderer.

FIG. 6 is a block diagram showing an example functional configuration of the renderer 13.

The renderer 13 includes a communication unit 66, a device-information manager 251, a control-command receiver 252, a command processor 253, a content reception processor 254, a buffer 255, a content decoder 256, a content display/playback processor 257, an audio output unit 258, and a streaming-information processor 259.

The communication unit 66 corresponds to the communication unit 66 shown in FIG. 3. For example, the communication unit 66 carries out communications with the controller 11 or the server 14 via the network 12.

The communication unit 66 includes a transmitter 261 for sending various types of data and a receiver 262 for receiving various types of data. The receiver 262 supplies a renderer searching request received from the controller 11 via the network 12 to the device-information manager 251.

The device-information manager 251 generates profile information on the basis of device information recorded therein. The device-information manager 251 supplies the profile information to the communication unit 66.

The transmitter 261 sends the profile information supplied from the device-information manager 251 to the controller 11 via the network 12. The controller 11 uses the profile information, for example, when selecting a renderer 13. The receiver 262 supplies a content playback instruction received from the controller 11 via the network 12 to the control-command receiver 252.

The control-command receiver 252 checks whether a content playback instruction has been received from the controller 11 on the basis of data supplied from the communication unit 66.

When it is determined that a content playback instruction has been received, the command processor 253 generates a content playback request for requesting the server 14 to provide a certain piece of content, and supplies the content playback request to the communication unit 66 via the control-command receiver 252. The transmitter 261 sends the content playback request supplied from the control-command receiver 252 to the server 14 via the network 12. The receiver 262 supplies content received from the server 14 via the network 12 to the content reception processor 254.

The content reception processor 254 checks whether content has been received from the server 14 on the basis of data supplied from the communication unit 66.

The content decoder 256 executes a predetermined decoding process on the content supplied from the content reception processor 254 via the buffer 255, the decoding process corresponding to an encoding process executed by a content encoder 303 described later. The content decoder 256 supplies the decoded content to the content display/playback processor 257.

Furthermore, for example, when different renderers 13 are used for display of image of content and for output of sound of content, the content decoder 256 executes a predetermined decoding process corresponding to an encoding process executed by the content encoder 303 on the content supplied from the content reception processor 254, and supplies decoded image data of the content to the content display/playback processor 257 and supplies decoded audio data of the content to the audio output unit 258.

The content display/playback processor 257 supplies the content to the GDP 68 so that the content is displayed on the screen of the LCD 69 and playback of the content is started. The audio output unit 258 supplies the audio data of the content supplied from the content decoder 256 to a speaker (not shown) or the like.

The streaming-information processor 259 monitors the amount of data stored in the buffer 255, and presents information regarding the amount of data to the user. In the following description, it is assumed that the amount of data stored in the buffer 255 serves as an index representing a condition of streaming and that the streaming-information processor 259 executes processing for presenting the status of streaming to the user.

Figure 7:
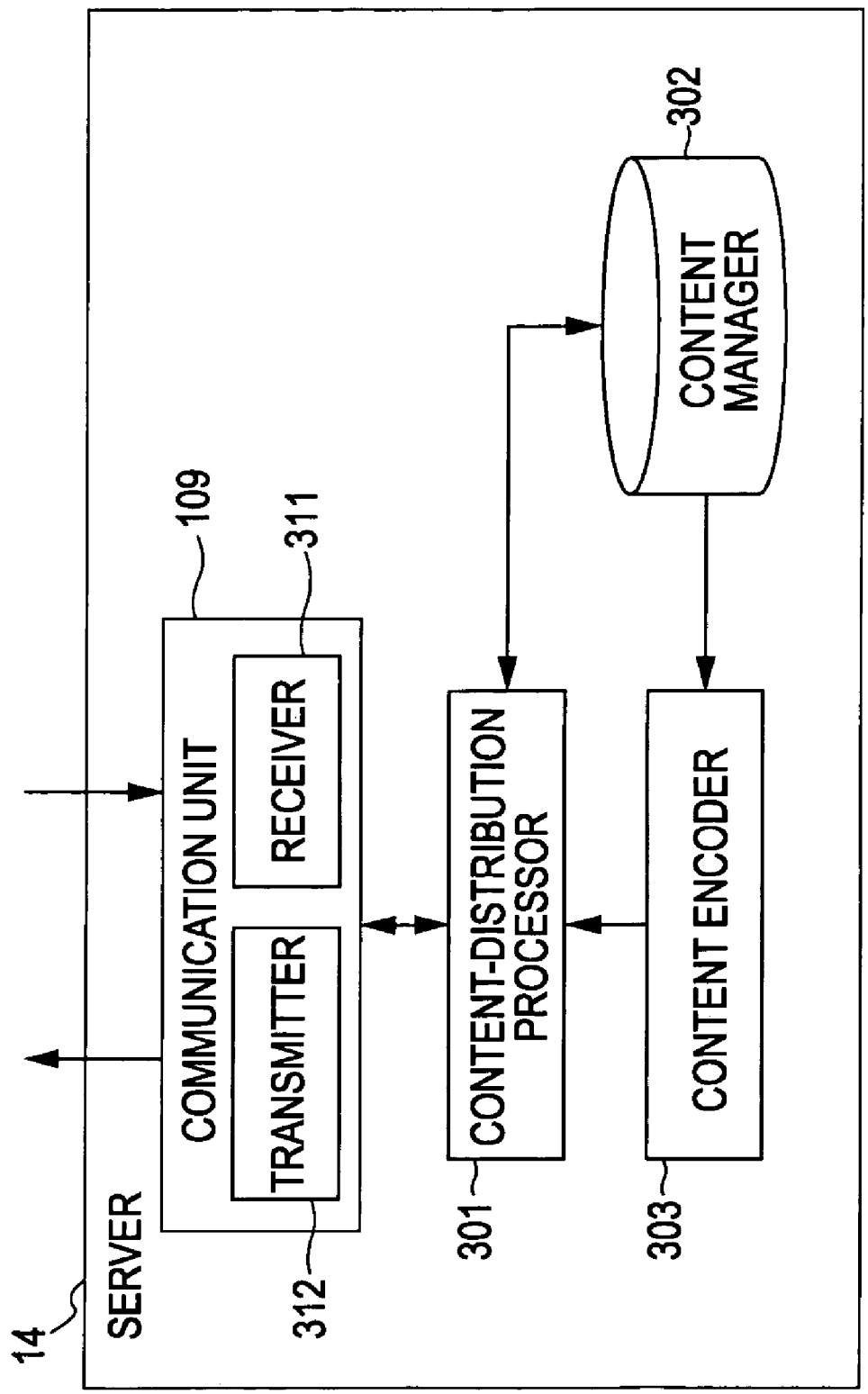
FIG. 7 is a diagram showing an example functional configuration of the server.

FIG. 7 is a block diagram showing an example functional configuration of the server 14.

The server 14 includes a communication unit 109, a content-distribution processor 301, a content manager 302, and a content encoder 303.

The communication unit 109 corresponds to the communication unit 109 shown in FIG. 4. For example, the communication unit 109 carries out communications with the controller 11 or the renderer 13 via the network 12.

The communication unit 109 includes a transmitter 312 for sending various types of data and a receiver 311 for receiving various types of data. The receiver 311 supplies a content-list obtaining request received from the controller 11 via the network 12 to the content-distribution processor 301.

In response to the content-list obtaining request supplied from the communication unit 109, the content-distribution processor 301 generates a content list by reading information regarding content, recorded in the content manager 302. The content-distribution processor 301 supplies the content list to the communication unit 109.

The transmitter 312 sends the content list supplied from the content-distribution processor 301 to the controller 11 via the network 12. The receiver 311 supplies a content playback request received from the renderer 13 via the network 12 to the content-distribution processor 301. The content-distribution processor 301 supplies the content playback request supplied from the communication unit 109 to the content manager 302.

In response to the content playback request supplied from the content-distribution processor 301, the content manager 302 supplies content to the content encoder 303. The content encoder 303 obtains content from the content manager 302, executes a predetermined encoding process on the content, and supplies the resulting encoded content to the content-distribution processor 301.

The content-distribution processor 301 obtains the content supplied from the content encoder 303, and supplies the content to the communication unit 109. The transmitter 312 sends the content supplied from the content-distribution processor 301 to the renderer 13 via the network 12.

Next, as an example of a process executed by the content playback system 1 according to this embodiment, a process in which content selected by the user is played back (displayed) by a render 13 selected by the user will be described.

Figure 8:
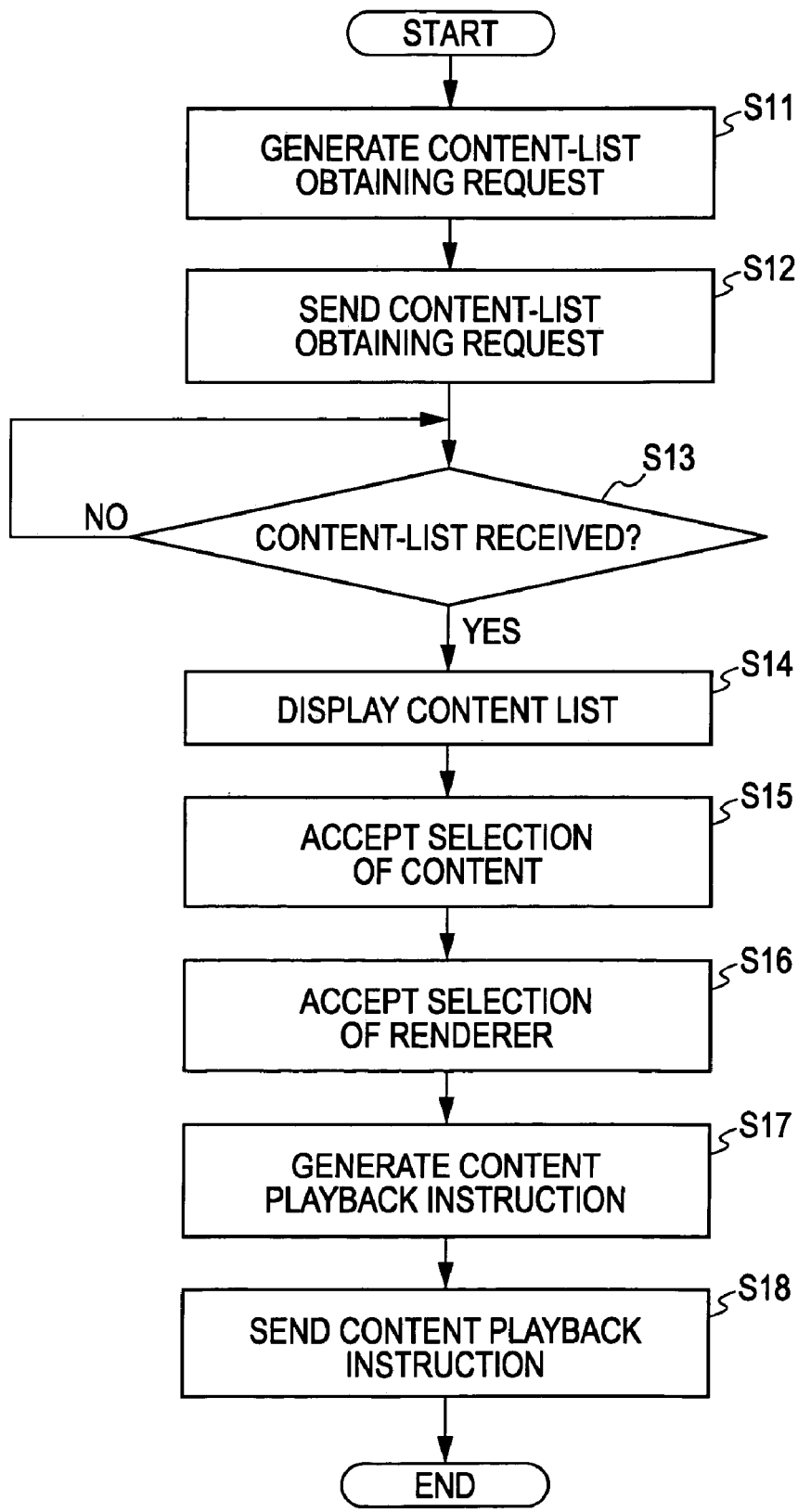
FIG. 8 is a flowchart of a content playback process executed by the controller.

FIG. 8 is a flowchart of a content playback process executed by the controller 11.

In step S11, the content-list obtaining unit 201 generates a content-list obtaining request in order to request a list of pieces of content that can be provided by the server 14. The content-list obtaining unit 201 supplies the content-list obtaining request to the communication unit 36.

In step S12, the communication unit 36 sends the content-list obtaining request supplied from the content-list obtaining unit 201 to the server 14 via the network 12.

In step S13, the content-list obtaining unit 201 checks whether a content list has been received from the server 14 on the basis of data supplied from the communication unit 36.

When it is determined in step S13 that a content list has not been received, the process returns to step S13 and step S13 is repeated. That is, the controller 11 waits until a content list is transmitted from the server 14.

On the other hand, when it is determined in step S13 that a content list has been received, the process proceeds to step S14, in which the content-list obtaining unit 201 supplies the content list supplied from the communication unit 36 to the GDP 38 (FIG. 2) so that the content list is displayed on the screen of the LCD 39. For example, the content-list obtaining unit 201 supplies the content list supplied from the communication unit 36 to the GDP 38 so that "Content A", "Content B", and "Content C" are displayed on the screen of the LCD 39 as a list of pieces of content that can be provided by the server 14.

The content list obtained by the content-list obtaining unit 201 includes information regarding the status of each piece of content. The information regarding the status of content represents whether the content is being used by one of the renderers 13 connected to the network 12, for example, the content is being played back or playback of the content is suspended.

Furthermore, the information regarding the status of content may include information regarding the renderer 13 that is using the content, for example, information representing the renderer 13 to which the content is being provided.

Figure 9:
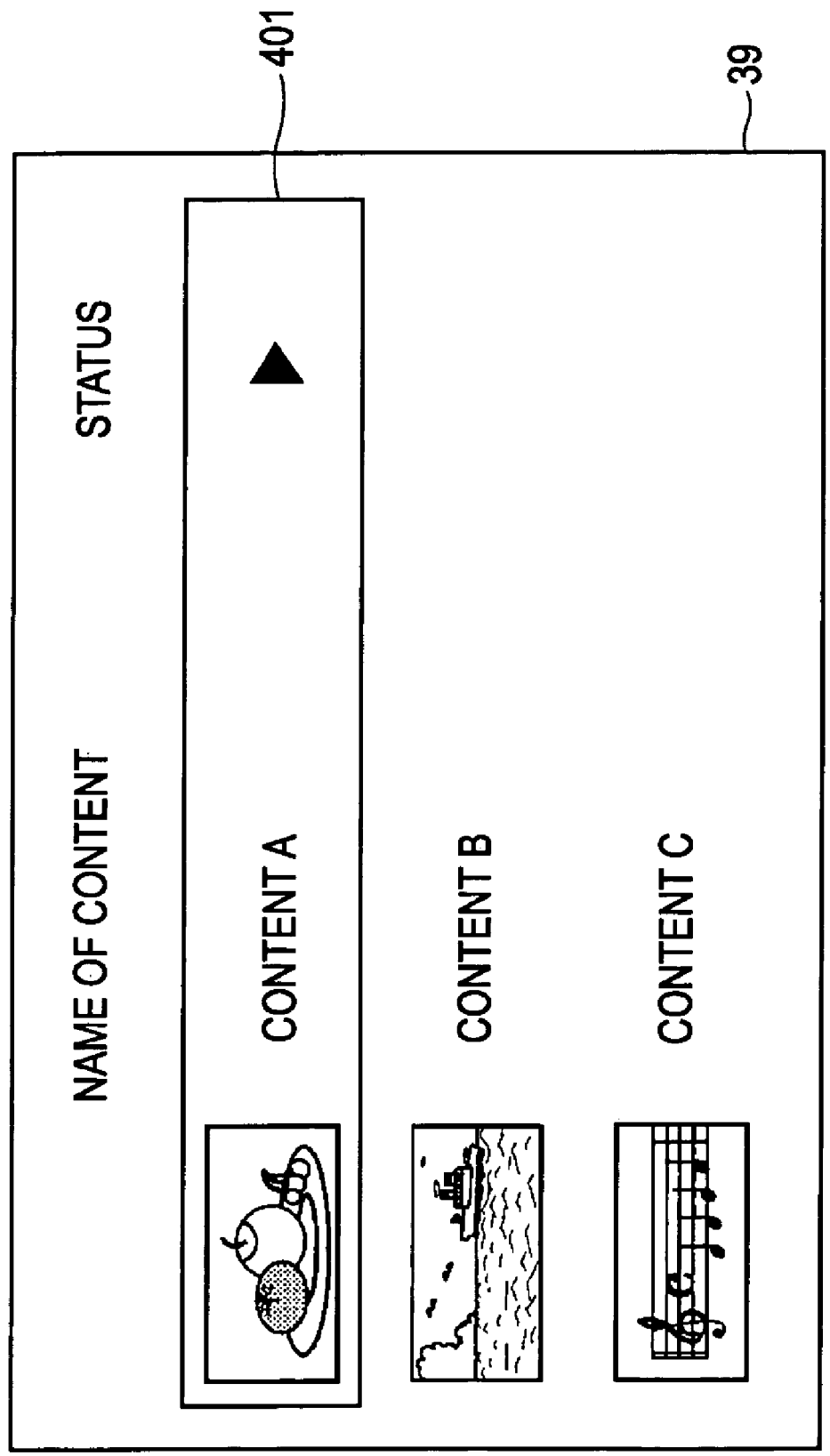
FIG. 9 is a diagram showing an example of a content list that is displayed.

Upon obtaining the content list including the information regarding the status of content, the content-list obtaining unit 201 supplies the content list to the GDP 38 so that the content list is displayed on the LCD 39. FIG. 9 shows an example of the content list displayed on the LCD 39.

In the example screen shown in FIG. 9, the content list supplied from the server 14 includes three content names, namely, "Content A", "Content B", and "Content C". As shown in FIG. 9, content names are displayed first as information for identifying content.

As information for identifying content, in addition to content names, thumbnail images each representing one scene of content are displayed. In the example shown in FIG. 9, thumbnail images are displayed on the left side of content names. The content list obtained by the content-list obtaining unit 201 also includes information regarding the thumbnail images.

Furthermore, as shown in FIG. 9, information representing the status of content is displayed on the right side of content names. In the example shown in FIG. 9, a triangle mark, which generally indicates playback, is displayed on the right side of the content name "Content A". That is, in this case, the user is provided with information indicating that of the content provided from the server 14, the content A is being played back, for example, by the renderer 13-1.

Furthermore, a cursor 401 is displayed on the LCD 39. The cursor 401 is operated when, for example, the user selects content that the user wishes to play back. In the example shown in FIG. 9, the cursor 401 is located on "Content A". In this example, the cursor 401 is moved upward and downward (in the vertical direction in FIG. 9).

Although it is assumed herein that the cursor 401 moves upward and downward, alternatively, the displayed information regarding content, such as content names, may be moved upward and downward while displaying the cursor 401 as fixed.

Figure 10:
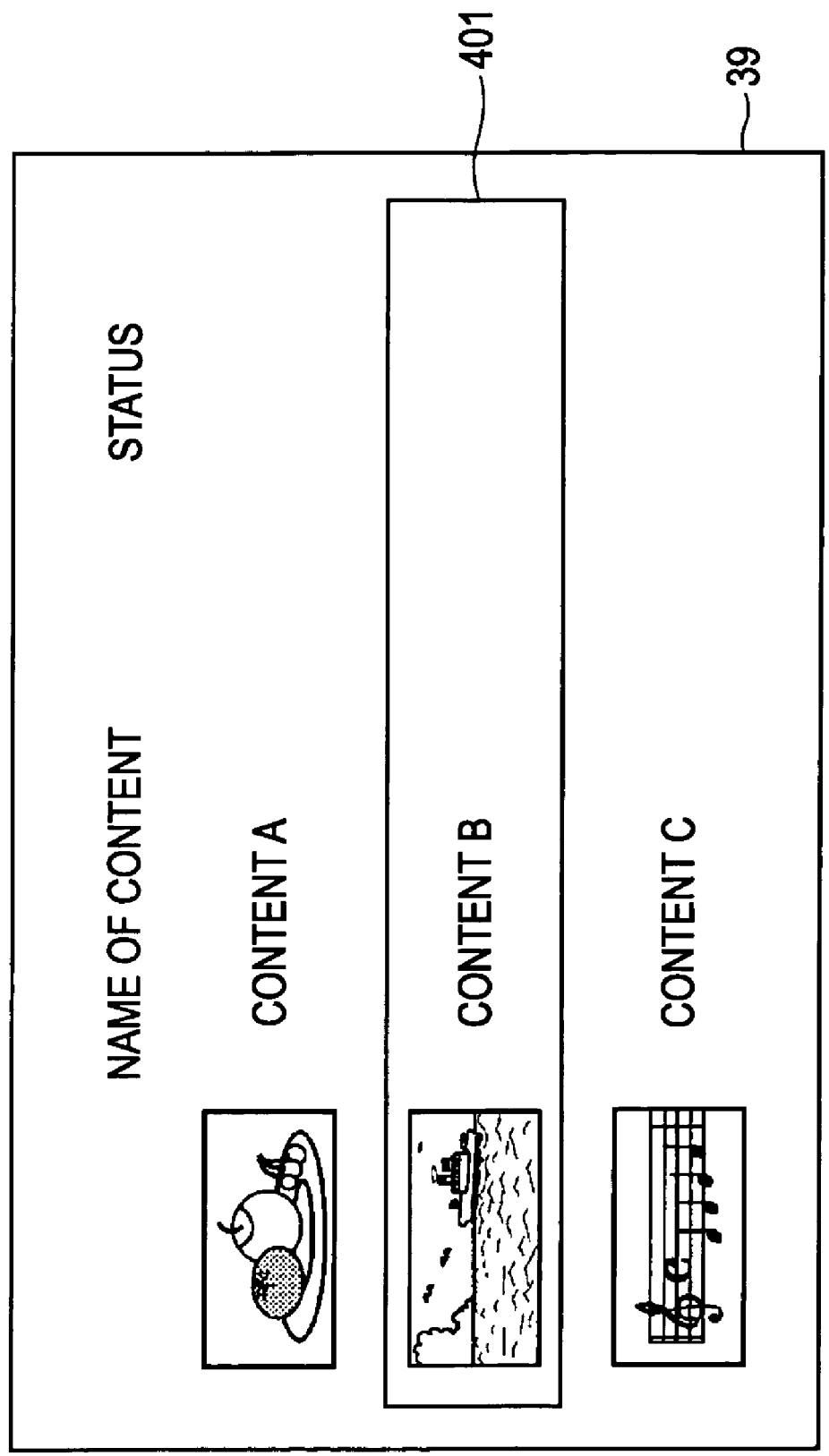
FIG. 10 is a diagram showing an example of a content list that is displayed.

FIG. 10 shows the screen of the LCD 39 that is displayed when the user operates the input-switch matrix 32 to move the cursor 401 downward. In the screen shown in FIG. 10, the cursor 401 has moved to the content name "Content B". Since the content B is not being played back or otherwise being used, no mark is displayed in the status field. As described above, it is possible to display information representing the status of content only when the cursor 401 is located in association with the content.

The content on which the cursor 401 is located can be considered as content that the user is interested in. Thus, by displaying only information regarding the content of interest, information can be presented to the user effectively.

Figure 11:
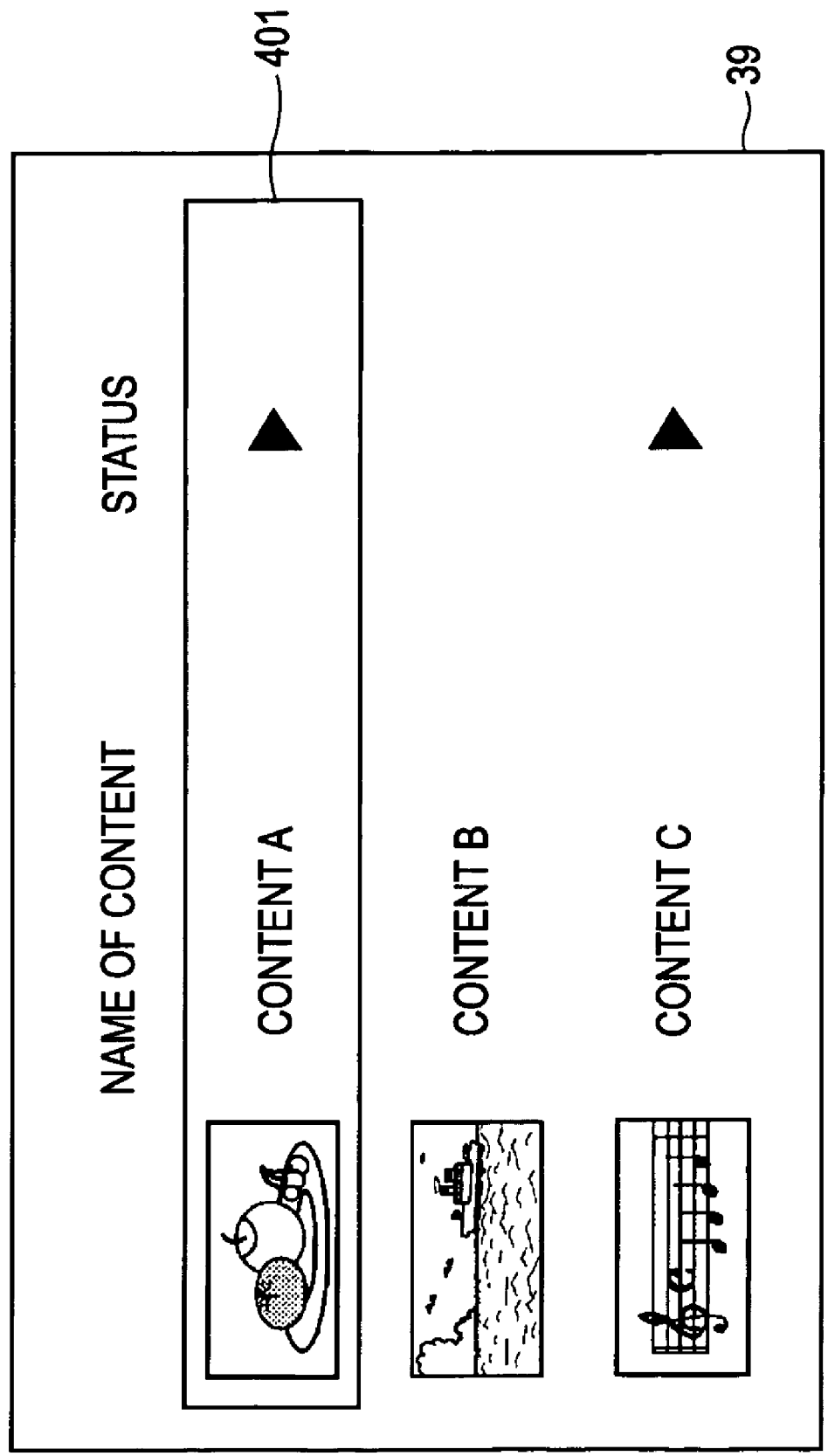
FIG. 11 is a diagram showing an example of a content list that is displayed.

Obviously, it is possible to also display information regarding content on which the cursor 401 is not located when information (mark) that is to be displayed for the content exists, as shown in FIG. 11. In the example shown in FIG. 11, no information that is to be displayed for the content B exists, so that no information is displayed in the status field for the content B. On the other hand, since the content C is being played back (being provided to another apparatus), a mark indicating the status is displayed in the status field for the content C.

The information displayed in the status field may include information representing which renderer 13 the content is being provided to (information representing a destination apparatus to which the content is being provided) as well as a mark representing a status of playback or the like. In an example shown in FIG. 12, information indicating that "Content A" is being provided from "Server" to "Renderer 13-1" is displayed in the status field. Obviously, instead of words such as "Server" and "Renderer 13-1", marks or the like representing the server and the renderer 13-1 may be displayed.

By displaying the status of content provided from the server 14 as described above, the following advantages can be achieved. As will be described later, for example, the user selects content that is to be played back by a renderer 13 from the content list shown in FIG. 12. When the selected content is being provided at the time of selection from the server 14 to another render 13 that is different from the renderer 13 that the user wishes to use to play back the content, if playback of the content is instructed, it could occur that playback of the content is started from the beginning thereof.

For example, when the content A is being played back by the renderer 13-1 and the user instructs start of playback of the content A by the renderer 13-2, it could occur that playback of the content A is started from the beginning thereof. This situation can be prevented, for example, by presenting the status of the content A to the user so that the user can recognize the status of the content A, as shown in FIG. 12.

Furthermore, for example, when the server 14 is not capable of providing a single piece of content (data of the same scene or difference scenes) simultaneously to two renderers 13 (e.g., in the case of an apparatus such as a VTR (Video Tape Recorder)), by providing the user with information regarding the status of content, the user can be prevented from selecting content that the server 14 is not currently able to provide.

Furthermore, the renderer 13 connected to the network 12 is not necessarily located in the same room as the controller 11. That is, using the controller 11, the user can operate the renderer 13 located in a room different from a room where the user is located.

Figure 12:
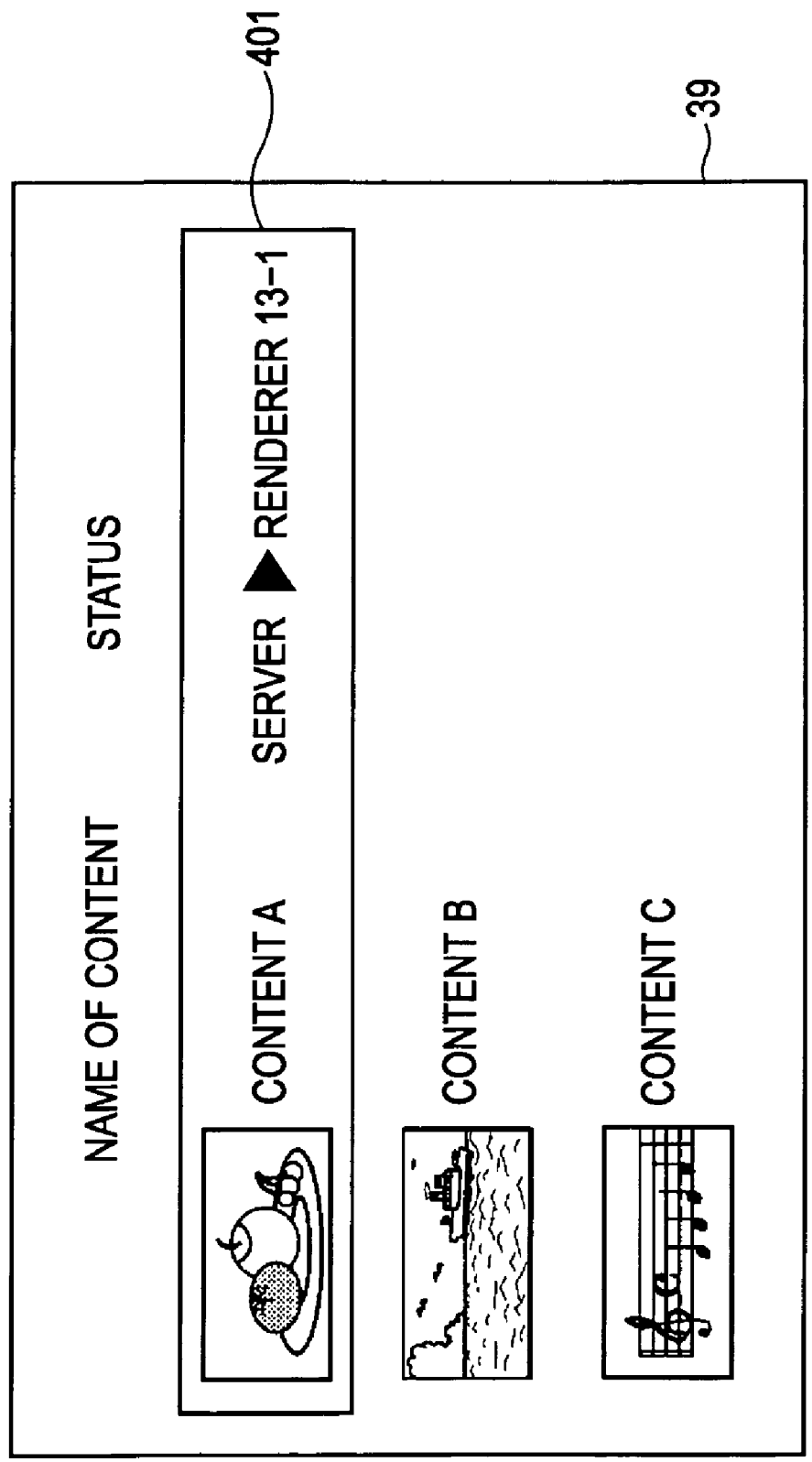
FIG. 12 is a diagram showing an example of a content list that is displayed.

For example, by presenting information representing the status of content as shown in FIG. 12, the user can recognize the status of content being played back by the renderer 13 at a remote location (where the user is not able to view directly). Thus, for example, the user can go to another room and view content being played back by a renderer 13 located in that room.

As described above, by displaying the status of content on the LCD 39, the user can recognize the status of content. This makes a considerable advantage.

The information displayed as the status of information may include information other than marks representing playback or the like and destinations of content. The screens shown in FIGS. 9 to 12 should be constructed only as examples, and should not be construed as limitations. That is, the screens may take other forms.

The above description has been given in the context of an example where a content list obtained from the server 14 includes information regarding the status of content. However, information regarding the status of content may be included in a list (data) other than a content list. For example, information regarding the status of content may be included in a server list so that the processing described above is executed by obtaining the server list.

Alternatively, a content list may be included in a server list. Yet alternatively, information regarding the status of content may be obtained separately from a content list. As described above, the format and source of information regarding the content may be changed as appropriate depending on system configuration or other factors.

In this specification, a content list refers to a list including information regarding content as well as a list of pieces of content. However, for the convenience of description, the term "content list" is used even when information regarding content is not included in (separate from) a content list.

Referring back to the flowchart shown in FIG. 8, in step S15, the content selector 202 accepts selection of content from the content list displayed on the screen of the LCD 39 (e.g., the screens shown in FIGS. 9 to 12) according to user's operations of the input-switch matrix 32. Furthermore, the content selector 202 obtains information regarding selected content from the content-list obtaining unit 201, and supplies the information to the content display/playback processor 203.

For example, the piece of content corresponding to "Content B" is selected among the pieces of content corresponding to "Content A", "Content B", and "Content C" according to user's operations of the input-switch matrix 32, the content selector 202 supplies information regarding the piece of content corresponding to "Content B" to the content display/playback processor 203. The information regarding content refers to information for identifying a piece of content selected by the user, such as an ID assigned to the piece of content.

In step S16, selection of a render 13 for playing back the selected content. For example, when a piece of content has been selected, the screen displayed on the LCD 39 is changed to a screen for selecting a renderer 13. In the screen for selecting a renderer 13, information regarding apparatuses that are currently connected to the network 12 and that are capable of playing back content, such as the names of rooms where the apparatuses are located and the names of the apparatuses, is displayed.

The user selects and determines a render 13 that is to be used for playing back content from the screen (not shown) for selecting a renderer 13. The user performs this operation via the input-switch matrix 32.

In step S17, on the basis of information representing the piece of content that is to be played back and information representing the selected renderer 13, the content display/playback processor 203 generates a content playback instruction, which is a request for instructing playback of content. The content display/playback processor 203 supplies the content playback instruction to the communication unit 36. For example, the content display/playback processor 203 generates a content playback instruction on the basis of information representing the piece of content corresponding to "Content B" and information representing the "renderer 13-1", and supplies the content playback instruction to the communication unit 36.

In step S18, the communication unit 36 sends the content playback instruction supplied from the content display/playback processor 203 to the renderer 13 selected from the list via the network 12. For example, the communication unit 36 sends the content playback instruction for playing back the piece of content corresponding to "Content B", supplied from the content display/playback processor 203, to the "renderer 13-1" via the network 12.

In this way, the server 14 starts providing content to the renderer 13.

When playback of the content instructed by the user is started by the renderer 13, the controller 11 presents the user with information regarding the content being played back by the renderer 13.

Figure 13:
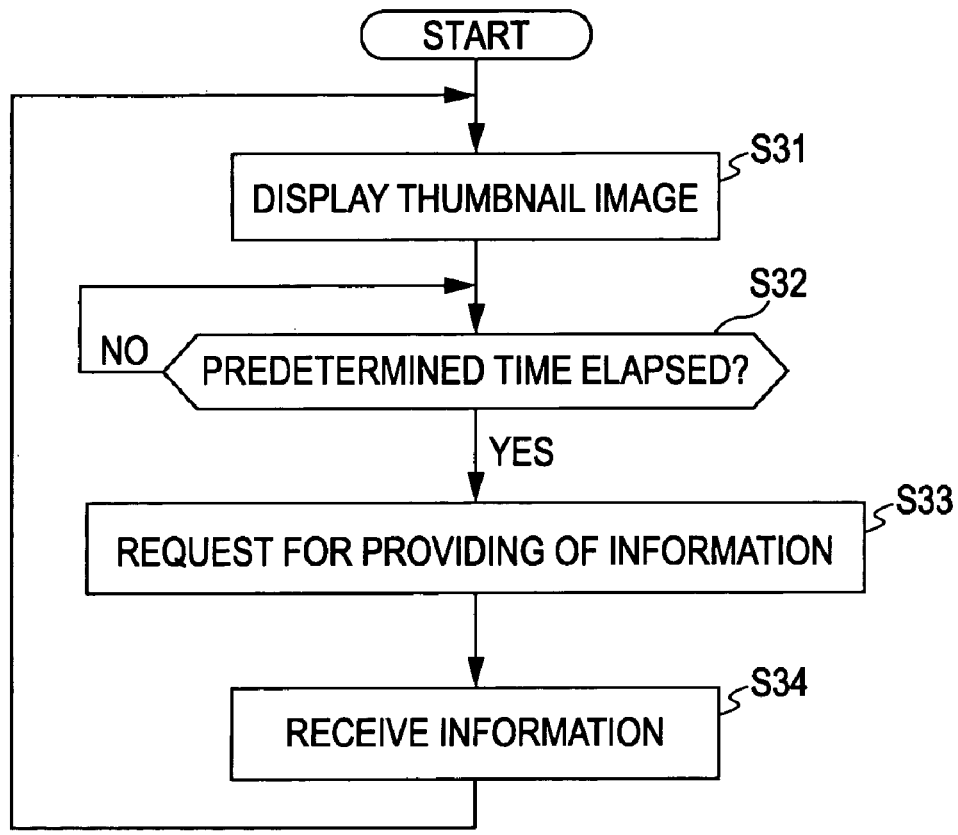
FIG. 13 is a flowchart of a content-information presenting process.

Now, a process of presenting the user with information regarding content that is being played back by the renderer 13 will be described with reference to a flowchart shown in FIG. 13. The process according to the flowchart shown in FIG. 13 is executed by the content-information processor 205 (FIG. 5) of the controller 11.

Figure 14:
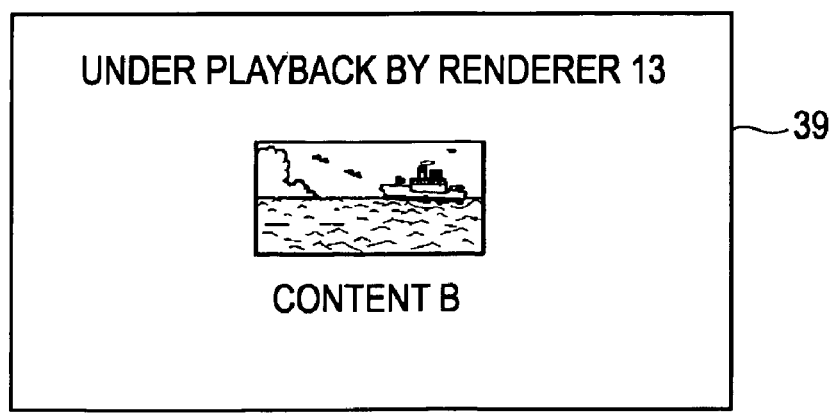
FIG. 14 is a diagram showing an example of a screen in which a thumbnail image is displayed.

In step S31, a thumbnail image is displayed. When playback of a certain piece of content is started through the process executed by the controller 11 as described above and processes executed by the renderer 13 and the server 14 as will be described later, a thumbnail image of the selected content (the content whose playback has been started) is displayed on the LCD 39 of the controller 11, for example, as shown in FIG. 14.

The thumbnail image displayed at this time is generated from data obtained from information included in the content list. For example, when "Content B" has been selected from the content list shown in FIG. 12, a thumbnail image representing "Content B" (the image displayed on the left side of the content name "Content B" in FIG. 12) is displayed.

As described above, when playback of content has been started by the specified renderer 13, on the LCD 39 of the controller 11, information representing which render 13 has started playback, the name of the content whose playback has been started, and the thumbnail image representing a scene of the content (an image representing a certain scene included in the content being played back by the renderer 13) are displayed.

The information displayed allows the user to recognize which content is being played back by which renderer. Furthermore, when the controller 11 is configured to allow operation of the renderer 13, information that serves for identification of the renderer 13 can be presented.

Instead of displaying the thumbnail image included in the content list on the LCD 39 of the controller 11 and keeping the thumbnail image displayed as described above, the thumbnail image displayed on the LCD 39 may be switched (updated) in accordance with the content being played back by the renderer 13. When the thumbnail image displayed is constantly updated, video image same as the video image played back by the renderer 13 is displayed on the controller 11. However, since video image same as the video image played back by the renderer 13 need not be displayed on the controller 11, the process is executed according to the flowchart shown in FIG. 13.

More specifically, when a thumbnail image is displayed in step S31, it is checked in step S32 whether a predetermined time has elapsed. An arrangement may be provided so that the predetermined time can be set by the user. Alternatively, a relatively short period, for example, 30 seconds, or a relatively long period, for example, 10 minutes, may be set as the predetermined time. The predetermined time is set as appropriate in consideration of the processing ability of the controller 11 or preference (convenience) of the user.

When it is determined in step S32 that the predetermined time has elapsed, the process proceeds to step S33. In step S33, a request is issued to the server 14 to request the server 14 to provide information (a thumbnail image in this case) regarding content that is currently being provided to the renderer 13. In step S34, information transmitted from the server 14 in response to the request is received.

As described above, the controller 11 obtains information regarding content from the server 14 at predetermined intervals. Thus, the image displayed on the LCD 39 is updated at predetermined intervals.

The information transmitted from the server 14 is, for example, meta-information regarding content that is being provided to the renderer 13 at the time of issuance of the request. Upon receiving the meta-information transmitted from the server 14, the content-information processor 205 of the controller 11 returns to step S31 and repeats subsequent steps. Thus, a new thumbnail image is displayed on the LCD 39.

When data of a thumbnail image is included in the meta-information transmitted from the server 14, the thumbnail image is displayed on the LCD 39. For example, when data in animation GIF (Graphic Interchange Format) is included, an image based on the data is displayed. For example, since animation GIF serves to save a plurality of still pictures in the GIF format in a single file and to sequentially display the still pictures so that a moving picture is displayed, the user is provided with a pseudo moving image regarding the content being played back by the renderer 13.

Although information such as a thumbnail image or a moving image is presented to the user in the example described above, other information may also be presented to the user.

Figure 15:
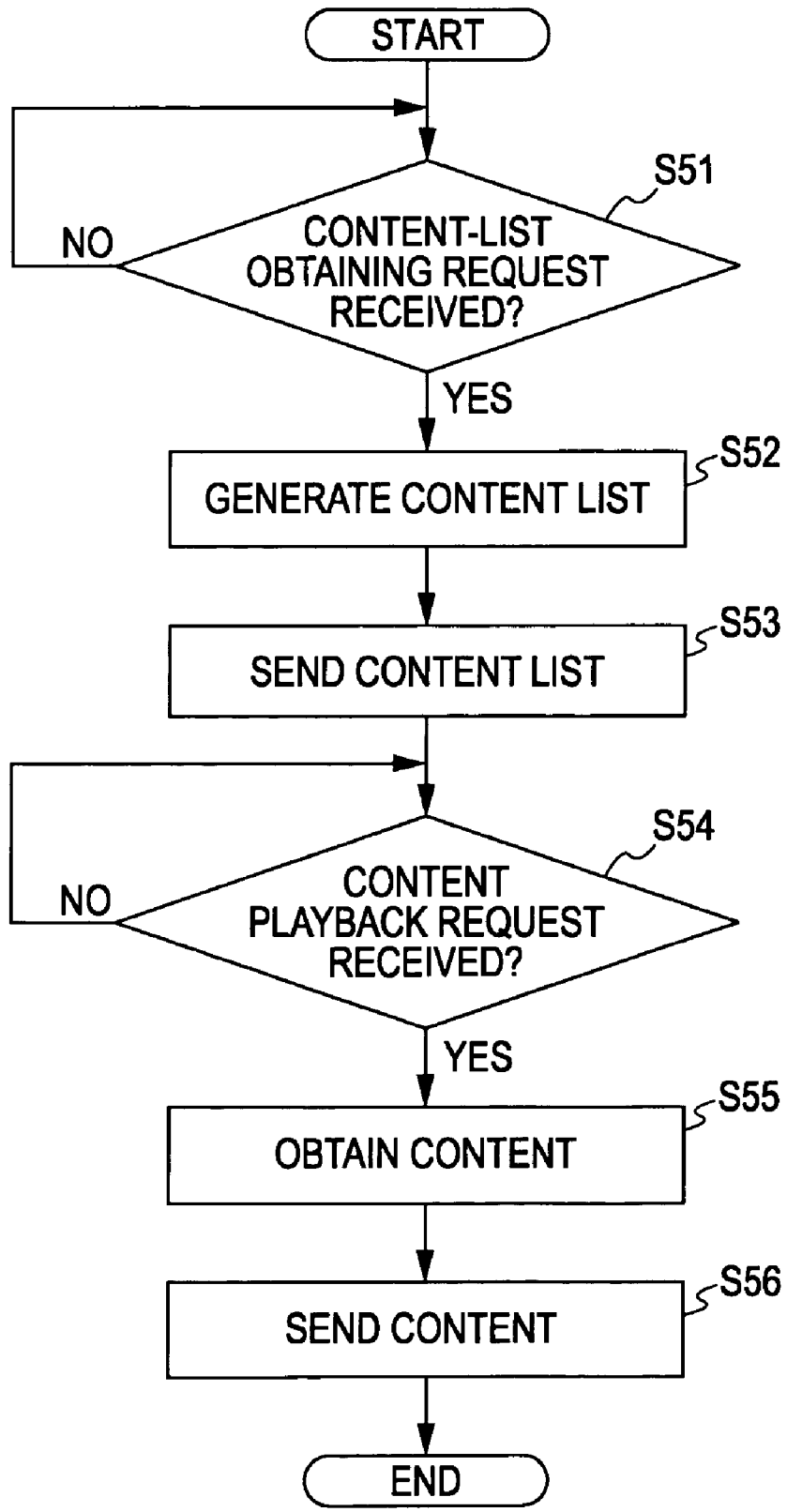
FIG. 15 is a flowchart of a content providing process executed by the server.

The process described above is executed by the controller 11. Next, a content providing process executed by the server 14 will be described with reference to a flowchart shown in FIG. 15.

In step S51, the content-distribution processor 301 checks whether a content-list obtaining request has been received from the controller 11 on the basis of data supplied from the communication unit 109.

When it is determined in step S51 that a content-list obtaining request has not been received, the process returns to step S51 and step S51 described above is repeated. That is, the server 14 waits until a content-list obtaining request is received from the controller 11.

On the other hand, when it is determined in step S51 that a content-list obtaining request has been received, the process proceeds to step S52, in which the content-distribution processor 301 generates a content list. The content-distribution processor 301 supplies the content list to the communication unit 109. For example, the content-distribution processor 301 generates a content list including pieces of content corresponding to "Content A", "Content B", and "Content C" as pieces of content that the server 14 can provide, by reading information regarding content, recorded in the content manager 302. The content-distribution processor 301 then supplies the content list to the communication unit 109.

The content list also includes information regarding the status of each piece of content (e.g., information representing the status that the piece of content is being provided to the renderer 13).

In step S53, the communication unit 109 sends the content list supplied from the content-distribution processor 301 to the controller 11 via the network 12.

In step S54, the content-distribution processor 301 checks whether a content playback request has been received from the renderer 13 on the basis of data supplied from the communication unit 109.

When it is determined in step S54 that a content playback request has not been received, the process returns to step S54, and step S54 described above is repeated. That is, the server 14 waits until a content playback request is received from the renderer 13.

When it is determined in step S54 that a content playback request has been received, the process proceeds to step S55, in which the content-distribution processor 301 obtains content from the content manager 302. The content-distribution processor 301 supplies the content to the communication unit 109.

For example, the content-distribution processor 301 supplies a content playback request for playing back a piece of content corresponding to "Content B" to the content manager 302. The content manager 302 supplies the piece of content corresponding to "Content B" from pieces of content recorded therein. The content encoder 303 encodes the piece of content corresponding to "Content B" supplied from the content manager 302 according to the MPEG 2 coding scheme. The content-distribution processor 301 obtains encoded content corresponding to "Content B", and supplies the encoded content to the communication unit 109.

In step S56, the communication unit 109 sends the content supplied from the content-distribution processor 301 to the renderer 13 via the network 12. For example, the communication unit 109 sends the content corresponding to "Content B", supplied from the content-distribution processor 301, to the renderer 13 selected by the user (e.g., the renderer 13-1) via the network 12.

The playback of content is finished in response to, for example, an instruction from the controller 11 or the renderer 13, a user's operation of the input unit 106, or an end of input of content from the content encoder 303. Then, the server 14 exits the content providing (playback) process.

Figure 16:
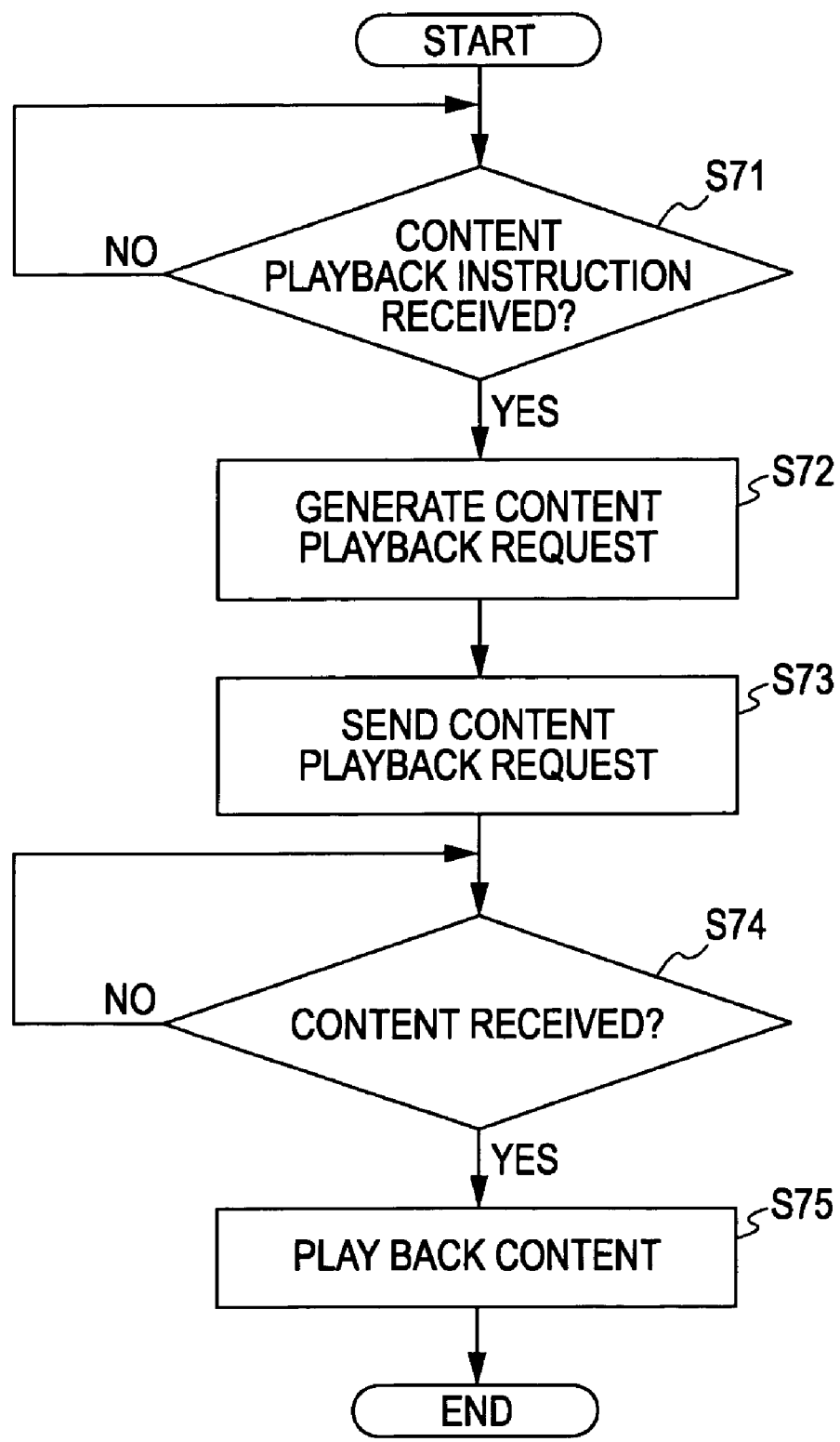
FIG. 16 is a flowchart of a content playback process executed by the renderer.

By executing the processes by the controller 11 and the server 14 as described above, a piece of content desired by the user is played back by a specified renderer 13. Next, a content playback process executed by the renderer 13 will be described with reference to a flowchart shown in FIG. 16.

In step S71, the control-command receiver 252 checks whether a content playback instruction has been received from the controller 11 on the basis of data supplied from the communication unit 66.

When it is determined in step S71 that a content playback instruction has not been received, the process returns to step S71 and step S71 described above is repeated. That is, the renderer 13 waits until a content playback instruction is received from the controller 11.

On the other hand, when it is determined in step S71 that a content playback instruction has been received, the process proceeds to step S72, in which the command processor 253 generates a content playback request for requesting the server 14 to provide a certain piece of content. The command processor 253 then supplies the content playback request to the communication unit 66 via the control-command receiver 252. For example, the command processor 253 generates a content playback request for requesting the server 14 to provide a piece of content corresponding to "Content B", and supplies the content playback request to the communication unit 66 via the control-command receiver 252.

In step S73, the communication unit 66 sends the content playback request supplied from the control-command receiver 252 to the server 14 via the network 12.

In step S74, the content reception processor 254 checks whether content has been received from the server 14 on the basis of data supplied from the communication unit 66. When it is determined in step S74 that that content has not been received, the process returns to step S74 and step S74 described above is repeated. That is, the renderer 13 waits until content is received from the server 14.

On the other hand, when it is determined in step S74 that content has been received, the process proceeds to step S75, in which the content display/playback processor 257 displays the content on the screen of the LCD 69 to start playback of the content. The content decoder 256 of the renderer 13 executes a predetermined decoding process on the content corresponding to "Content B", supplied from the content reception processor 254, the decoding process corresponding to an encoding process executed by the content encoder 303. The content decoder 256 then supplies the resulting decoded content to the content display/playback processor 257.

The content display/playback processor 257 supplies the content corresponding to "Content B", supplied from the content decoder 256, to the GDP 68 so that the content is displayed on the screen of the LCD 69, whereby playback of the content corresponding to "Content B" is started.

The playback of the content is finished in response to, for example, an instruction from the controller 11, a user's operation of the input-switch matrix 62, or an end of input of content from the content decoder 256. The renderer 13 then exits the content playback process.

Through the processes executed by the controller 11, the renderer 13, and the server 14, content provided from the server 14 is played back by a specified renderer 13.

As described earlier, the controller 11, the renderer 13, and the server 14 are connected to each other via the network 12. When content is provided from the server 14 to the renderer 13, the content is transmitted and received via the network 12. To the network 12, a plurality of renderers 13 are connected, as shown in FIG. 1. Thus, congestion of traffic on the network 12 can occur when the plurality of renderers 13 simultaneously transmit or receive data.

Even when playback of content is started by a specified renderer 13 through the processes described above, when congestion of traffic on the network 12 occurs, a situation could arise where a sufficient amount of content data is not supplied from the server 14 to the renderer 13.

Furthermore, when the network 12 connecting the renderer 13 and the server 14 is partially or entirely wireless, the condition of communications can be deteriorated depending on the condition of the atmosphere or the structure of a room. Furthermore, when the renderer 13 is a device that can be carried with by the user (hereinafter referred to as a mobile device), the condition of communications can be deteriorated when the mobile device (renderer 13) is carried with by the user.

In this embodiment, the controller 11 includes the codec 37 (FIG. 2), so that the controller 11 can play back content provided from the server 14. The controller 11 is usually constructed so that it can be carried with by the user. Thus, the user can enjoy content using the controller 11.

The condition of transmission and reception of data via the network 12, particularly, the conditions of streaming carried out with the renderer 13 (or the controller 11) that plays back content provided from the server 14, is not constantly stable and may change. Thus, by letting the user recognize the condition of streaming, when the condition of streaming is not favorable, the user is prompted to take a certain measure (e.g., move to a location where a favorable condition of streaming can be expected) to improve the condition.

Next, a process of letting the user recognize the condition of streaming (a process of presenting the user with information regarding the condition of streaming), executed by the renderer 13, will be described with reference to a flowchart shown in FIG. 17. Although the process will be described in the context of an example where the process is executed by the renderer 13, since the controller 11 can also play back content as described earlier, the process may also be executed by the controller 11.

In step S91, the streaming-information processor 259 (FIG. 6) monitors the amount of data stored in the buffer 255. The buffer 255 has two pointers, namely, a write pointer and a read pointer.

When the writing rate is higher than the reading rate, the content decoder 256 can execute decoding without interruption of data, so that the condition of streaming is stable. On the other hand, when the writing rate is lower than the reading rate, interruption of data to decode could occur in the content decoder 256, so that the condition of streaming is unstable.

It is possible to check whether the writing rate is higher than the reading rate by monitoring the difference (the absolute value of the difference) between the write pointer and the read pointer. Thus, in this example, the difference between the write pointer and the read pointer of the buffer 255 is used as in index representing the condition of streaming.

In step S92, it is checked whether the difference between the write pointer and the read pointer (hereinafter referred to as the pointer difference) is greater than or equal to a predetermined threshold. When the pointer difference is greater than or equal to the predetermined threshold, it is indicated that the writing rate is greater than or equal to the reading rate (i.e., a sufficient amount of data is stored in the buffer 255) so that the condition of streaming is stable. Thus, when it is determined in step S92 that the pointer difference is greater than or equal to the predetermined threshold, the process proceeds to step S93, in which information indicating the stable condition is displayed.

On the other hand, when the pointer difference is smaller than the predetermined threshold, it is indicated that the writing rate is lower than the reading rate (i.e., a sufficient amount of data is not stored in the buffer 255) so that the condition of streaming is unstable. Thus, when it is determined in step S92 that the pointer difference is smaller than the predetermined threshold, the process proceeds to step S94, in which information indicating the unstable condition is displayed.

Figure 17:
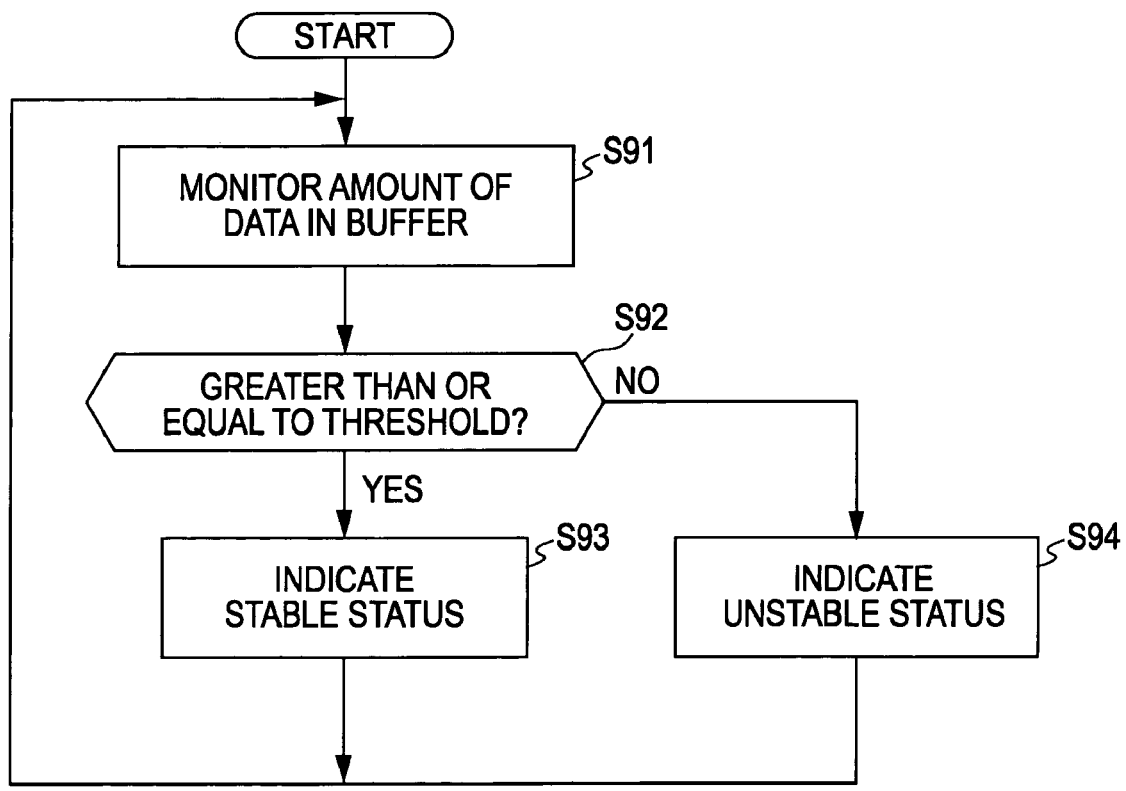
FIG. 17 is a flowchart of a process relating to presentation of a condition of streaming.

The process according to the flowchart shown in FIG. 17 is repeated while content is being played back by the renderer 13, so that the user is continuously presented with information regarding the condition of streaming. The presentation of information may be refrained (stopped) when so instructed by the user.

Figure 18:
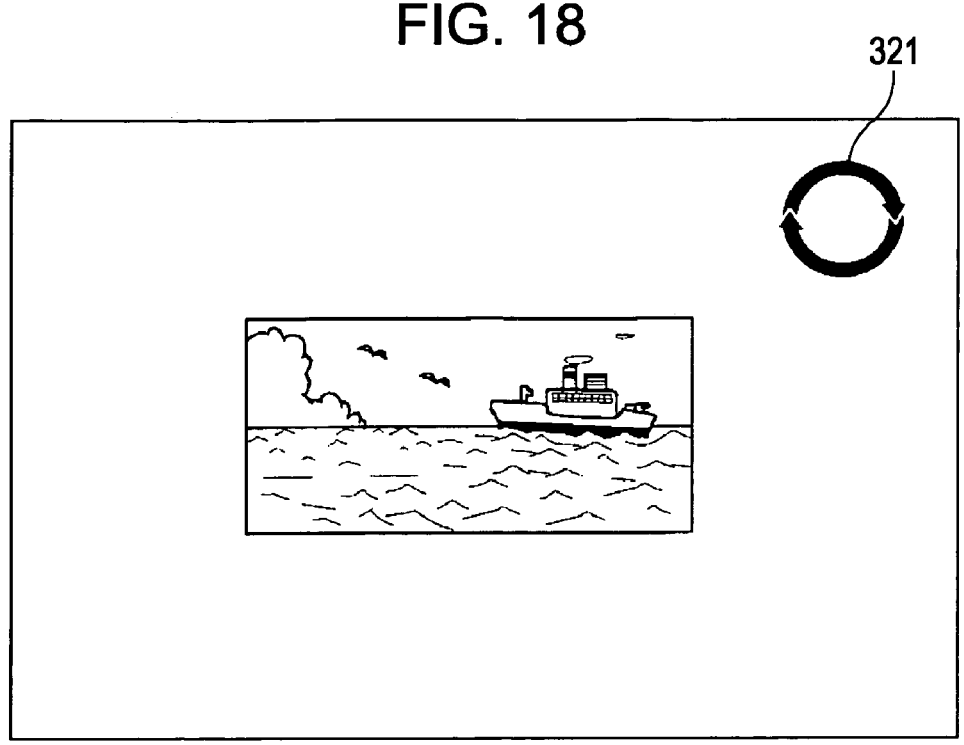
FIG. 18 is a diagram showing an example of a screen in which information representing a condition of streaming is displayed.

FIG. 18 is an example of the screen of the LCD 69 in a case where information representing the stable condition is displayed in step S93 or an example of the screen of the LCD 69 in a case where information representing the unstable condition is displayed in step S94.

As shown in FIG. 18, a streaming-information display area 321 is provided in relation to an image of content that is being played back, and a word or a mark representing the condition of streaming is displayed in the streaming-information display area 321. In the example shown in FIG. 18, a mark is displayed. The mark shown in FIG. 18 has such a shape that gives an image of a rotating circular arrow to the user.

The mark shown in FIG. 18 may be displayed in such a manner that the mark is rotating. The arrow mark may indicate a stable condition of streaming when the mark rotates rapidly while indicating an unstable condition of streaming when the mark rotates slowly. That is, the rotation rate of the arrow mark may represent the condition of streaming.

Figure 19:
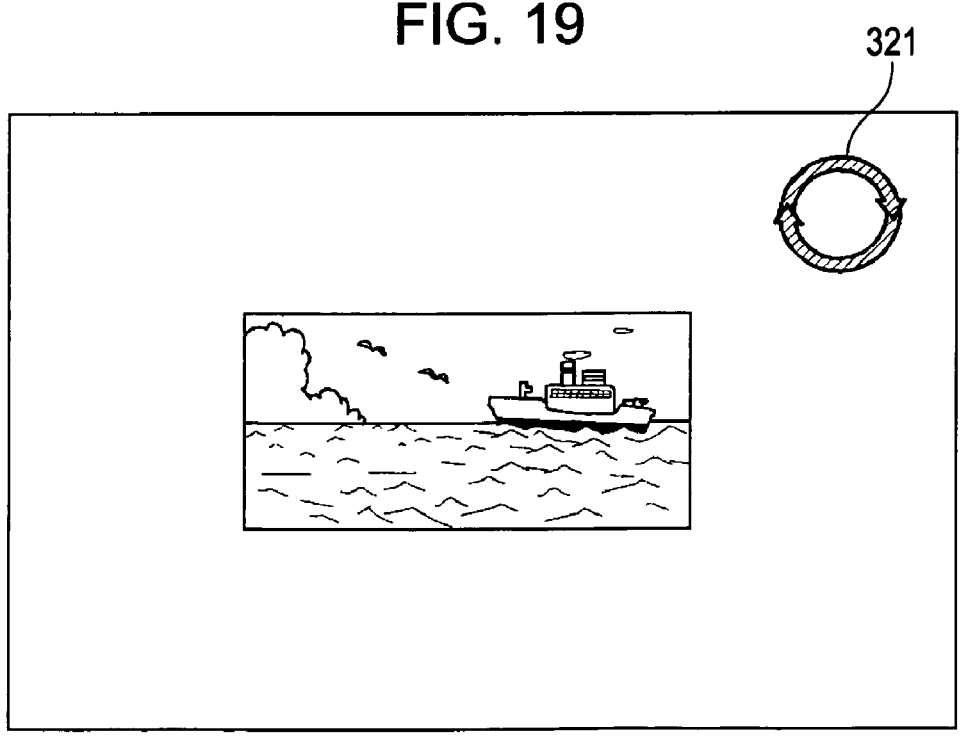
FIG. 19 is a diagram showing an example of a screen in which information representing a condition of streaming is displayed.

As another example, the form of the mark may be changed in accordance with the condition of streaming. For example, the mark may indicate a stable condition of streaming when the mark is solid as shown in FIG. 18 while indicating an unstable condition of streaming when the mark is hatched as shown in FIG. 19.

Also, the color of the mark may be changed, for example, the mark may indicate a stable condition of streaming when the mark is in blue while indicating an unstable condition of streaming when the mark is in red.

Furthermore, although only two conditions, namely, a stable condition and an unstable condition, can be indicated according to the flowchart shown in FIG. 17, it is possible to define a plurality of thresholds and to execute checking against each of the thresholds, so that a plurality of conditions of streaming, such as "Good", "Fair", and "Poor" can be indicated. When a plurality of conditions can be indicated as described above, the color of the mark may be changed, for example, blue for "Good", yellow for "Fair", and red for "Poor".

Also, the shape of the mark may be changed. For example, when the condition of streaming is represented by the mark shown in FIG. 18 (or FIG. 19), a mark having a thick arrow shape may be used to indicate a stable condition of streaming while using a mark having a thin arrow shape to indicate an unstable condition of streaming.

Furthermore, obviously, information representing the status of streaming may be displayed by a combination of the schemes of representation described above. For example, the condition of streaming may be represented by the rotation rate of a mark having an arrow shape and the color of the mark may be changed in accordance with the condition of streaming.

By presenting the user with information representing the condition of streaming as described above, the user can recognize the condition of streaming. Furthermore, the user can also recognize that content under playback is being received via the network 12. Thus, for example, when the condition of streaming becomes unstable, the user can take a certain measure to overcome the unstable condition and enjoy content comfortably.

It is to be understood that steps of a program provided using a medium may be executed in parallel or individually instead of being executed sequentially in the orders described in this specification.

In this specification, a system refers to the entirety of a unit formed by a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A controlling device that controls an apparatus, the controlling device comprising:
    obtaining means for obtaining, from the apparatus, a content-list including a list of content available from the apparatus;
    selecting means for selecting, from the apparatus for playback, a content from the content-list, and for selecting, from the apparatus, a display device, from a plurality of display devices other than a display device of the controlling device, to transmit the selected content to, wherein the obtaining means obtains image data of an image corresponding to the selected content from the apparatus; and
    display means for displaying the image from the obtained image data on the controlling device, wherein
    the display means simultaneously displays the image from the obtained image data together with a second image from a second obtained image data corresponding to a second content selected to be transmitted to a second selected display device of the plurality of display devices, and
    the display means displays the image and the second image together with corresponding information identifying the selected display device and the second selected display device.

2. The controlling device according to claim 1, wherein the obtained image data contains meta-information of the selected content.

3. The controlling device according to claim 1, wherein the content-list also includes a status of the content.

4. The controlling device according to claim 1, wherein each of the plurality of display devices is networked to the apparatus and each of the plurality of display devices includes a display screen to playback and display the selected content.

5. The controlling device according to claim 1, wherein the display means displays the image from the obtained image data on the controlling device while the selected content is displayed on the selected display device.

6. The controlling device according to claim 5, wherein the image displayed by the display means is a thumbnail image that is periodically updated to correspond to a portion of the selected content currently being displayed on the selected display device.

7. The controlling device according to claim 6, wherein a period for updating the thumbnail image is set by a user.

8. The controlling device according to claim 6, wherein a period for updating the thumbnail image is able to be set to a time between 30 seconds to 10 minutes.

9. The controlling device according to claim 5, wherein the image displayed by the display means is an animation of a plurality of thumbnail images saved in a single file to provide a pseudo moving image corresponding to the selected content being displayed on the selected display device.

10. The controlling device according to claim 1, wherein the display means displays the image and the second image together with corresponding information identifying a name of the selected content and a name the second selected content.

11. The controlling device according to claim 1, wherein the controlling device is a hand-held remote controller comprising:
a wireless network controller configured to transmit and receive data across a local area network, the data including the content-list obtained by the obtaining means and instructions corresponding to the selecting of the content and the selecting of the display device by the selecting means,
wherein the apparatus and the plurality of display devices are connected to the local area network.

12. A method of controlling with a controlling device that controls an apparatus, the method comprising:
obtaining, from the apparatus, a content-list including a list of content available from the apparatus;
selecting, from the apparatus for playback, a content from the content-list, and selecting, from the apparatus, a display device, from a plurality of display devices other than a display device of the controlling device, to transmit the selected content to, wherein the obtaining includes obtaining image data of an image corresponding to the selected content from the apparatus; and
displaying the image from the obtained image data on the controlling device including:
simultaneously displaying the image from the obtained image data together with a second image from a second obtained image data corresponding to a second content selected to be transmitted to a second selected display device of the plurality of display devices, and
displaying the image and the second image together with corresponding information identifying the selected display device and the second selected display device.

13. A computer readable medium including computer executable instructions, wherein the instructions, when executed by a processor, cause the processor to perform a method of controlling with a controlling device that controls an apparatus, the method comprising:
obtaining, from the apparatus, a content-list including a list of content available from the apparatus;
selecting, from the apparatus for playback, a content from the content-list, and selecting, from the apparatus, a display device, from a plurality of display devices other than a display device of the controlling device, to transmit the selected content to, wherein the obtaining includes obtaining image data of an image corresponding to the selected content from the apparatus; and
displaying the image from the obtained image data on the controlling device, including:
simultaneously displaying the image from the obtained image data together with a second image from a second obtained image data corresponding to a second content selected to be transmitted to a second selected display device of the plurality of display devices, and
displaying the image and the second image together with corresponding information identifying the selected display device and the second selected display device.

14. A controlling device that controls an apparatus, the controlling device comprising:
an obtaining device configured to obtain, from the apparatus, a content-list including a list of content available from the apparatus;
a selecting device configured to select, from the apparatus for playback, a content from the content-list, and select, from the apparatus, a display device, from a plurality of display devices other than a display device of the controlling device, to transmit the selected content to, wherein the obtaining device is further configured to obtain image data of an image corresponding to the selected content from the apparatus; and
a display device configured to display the image from the obtained image data on the controlling device, wherein
the display device is configured to simultaneously display the image from the obtained image data together with a second image from a second obtained image data corresponding to a second content selected to be transmitted to a second selected display device of the plurality of display devices, and
the display device is configured to display the image and the second image together with corresponding information identifying the selected display device and the second selected display device.

* * * * *